(12) United States Patent
Vijayan et al.

(10) Patent No.: US 12,634,608 B2
(45) Date of Patent: May 19, 2026

(54) OPTICAL FREQUENCY COMB LOCKING FOR A FLEXIBLE PASSIVE OPTICAL NETWORK

(71) Applicant: Nokia Solutions and Networks Oy, Espoo (FI)

(72) Inventors: Kovendhan Vijayan, Edison, NJ (US); Robert Borkowski, Berkeley Heights, NJ (US); Vincent Houtsma, New Providence, NJ (US); Doutje Van Veen, New Providence, NJ (US); Amitkumar Mahadevan, Edison, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 270 days.

(21) Appl. No.: 18/469,515

(22) Filed: Sep. 18, 2023

(65) Prior Publication Data

US 2025/0097612 A1 Mar. 20, 2025

(51) Int. Cl.
| | |
|---|---|
| *H04Q 11/00* | (2006.01) |
| *G02B 6/293* | (2006.01) |
| *H04B 10/25* | (2013.01) |

(52) U.S. Cl.
CPC ..... *H04Q 11/0067* (2013.01); *G02B 6/29301* (2013.01); *H04B 10/25* (2013.01)

(58) Field of Classification Search
CPC . H04B 10/25; H04Q 11/0067; G02B 6/29301
(Continued)

(56) References Cited

U.S. PATENT DOCUMENTS 7,991,291 B2 * 8/2011 Matsui ................ H04J 14/0226
398/91
8,543,001 B2 9/2013 Cheng
(Continued)

FOREIGN PATENT DOCUMENTS

| CN | 103297169 A | 9/2013 |
|---|---|---|
| WO | 2022008974 A1 | 1/2022 |
| WO | 2023020676 A1 | 2/2023 |

OTHER PUBLICATIONS

Extended European Search Report, corresponding EP Application No. 24200977.7-1206, dated Feb. 7, 2025, 10 pages.
(Continued)

*Primary Examiner* — Dalzid E Singh
(74) *Attorney, Agent, or Firm* — Tong, Rea, Bentley & Kim, LLC

(57) ABSTRACT

Various example embodiments for providing a passive optical network (PON), supporting communications between an optical line terminal (OLT) and a set of optical network units (ONUs) of a PON, are presented. The PON may be enabled based on use of an optical frequency comb (OFC), generated at the OLT and reconstructed at the ONUs for locking the OFC at the ONUs to the OFC at the OLT. The OFC may include a set of optical frequency lines used as seed lines for reconstruction of the OFC at the ONUs (e.g., the pair of OFC lines at the center of the OFC which may be used to regenerate locked OFCs at the ONUs), a set of optical frequency lines used to support downstream communications from the OLT to the ONUs, and a set of optical frequency lines used to support upstream communications from the ONUs to the OLT.

17 Claims, 12 Drawing Sheets

(58) Field of Classification Search

USPC ........................................................... 398/66

See application file for complete search history.

(56) References Cited

U.S. PATENT DOCUMENTS

| | | | | |
|---|---|---|---|---|
| 8,909,048 | B2 * | 12/2014 | Presi ................... | H04J 14/0282 |
| | | | | 398/67 |
| 10,897,310 | B2 | 1/2021 | Zhang et al. | |
| 11,115,126 | B2 | 9/2021 | Jia et al. | |
| 2021/0336703 | A1 * | 10/2021 | Jia .......................... | H04B 10/63 |
| 2022/0321223 | A1 | 10/2022 | Chiang | |
| 2023/0081925 | A1 * | 3/2023 | Chen ....................... | H04J 14/08 |
| | | | | 398/16 |

OTHER PUBLICATIONS

Zhou et al., "Multipoint-to-point data aggregation using a single receiver and frequency-multiplexed intensit ••modulated ONUs," Optical Networks Group, Huawei Technologies Duesseldorf GmbH, The Chinese University of Hong Kong, Optoelectronic Research Centre, dated Sep. 13, 2021, 8 pages.

Infinera white paper on XR optics.

H. Zhang et al., "Low-Cost 100G Coherent PON Enabled by TFDM Digital Subchannels and Optical Injection Locking," Proc. OFC 2023, paper W1I.4.

M. Mazur, A. Lorences-Riesgo, J. Schroder, P. A. Andrekson, and M. Karlsson, "High spectral efficiency PM-128 QAM comb-based superchannel transmission enabled by a single shared optical pilot tone," J. Lightw. Technol., vol. 36, No. 6, pp. 1318-1325, Mar. 2018.

J. Pfeifle et al., "Coherent terabit communications with microresonator Kerr frequency combs," Nature Photon., vol. 8, No. 5, pp. 375-380, May 2014.

J. N. Kemal et al., "32 QAM WDM transmission using a quantum-dash passively mode-locked laser with resonant feedback," in Proc. Opt. Fiber Commun. Conf. Exhib., Washington, DC, USA, 2017, Paper Th5C.3.

J. Pfeifle et al., "Flexible terabit/s nyquist-WDM super-channels using a gain-switched comb source," Opt. Express, vol. 23, No. 2, pp. 724-738, 2015.

Z. Liu and R. Slavík, "Optical Injection Locking: From Principle to Applications," in Journal of Lightwave Technology, vol. 38, No. 1, pp. 43-59, 1 Jan. 1, 2020, doi: 10.1109/JLT.2019.2945718.

S. Diez et al., "Four-wave mixing in semiconductor optical amplifiers for frequency conversion and fast optical switching," in IEEE Journal of Selected Topics in Quantum Electronics, vol. 3, No. 5, pp. 1131-1145, Oct. 1997, doi: 10.1109/2944.658587.

J. S. Levy, A. Gondarenko, A. C. Turner-Foster, M. A. Foster, A. L. Gaeta and M. Lipson, "Four-wave mixing in integrated silicon nitride waveguides," 2009 Conference on Lasers and Electro-Optics and 2009 Conference on Quantum electronics and Laser Science Conference, Baltimore, MD, USA, 2009, pp. 1-2, doi: 10.1364/CLEO.2009.CMFF5.

J. M. Chavez Boggio et al., "Optical frequency comb generated by four-wave mixing in highly nonlinear fibers," 2009 Conference on Lasers and Electro-Optics and 2009 Conference on Quantum electronics and Laser Science Conference, Baltimore, MD, USA, 2009, pp. 1-2.

Mazur, M., Lorences-Riesgo, A., Schroeder, J., Andrekson, P. A. & Karlsson, M. "10 Tb/s PM-64QAM self-homodyne comb-based superchannel transmission with 4% shared pilot tone overhead, " J. Lightwave Technol. 36, 3176-3184 (2018).

M. M. H. Adib et al., "Colorless Coherent TDM-PON Based on a Frequency-Comb Laser," in Journal of Lightwave Technology, vol. 40, No. 13, pp. 4287-4299, 1 Jul. 1, 2022, doi: 10.1109/JLT.2022.3164168.

* cited by examiner

*FIG. 1*
CON'T

PON
100

C2  C1

1                    ~2

· · ·                          · · ·

FROM/TO     DOWNSTREAM ⟹                        TO/FROM
OLT                                                              ONUs
110              ⟸ UPSTREAM                             120

2              ~1

· · ·                          · · ·

OPTICAL
DISTRIBUTION
NETWORK
130

CON'T

CON'T

CON'T

FIG. 6

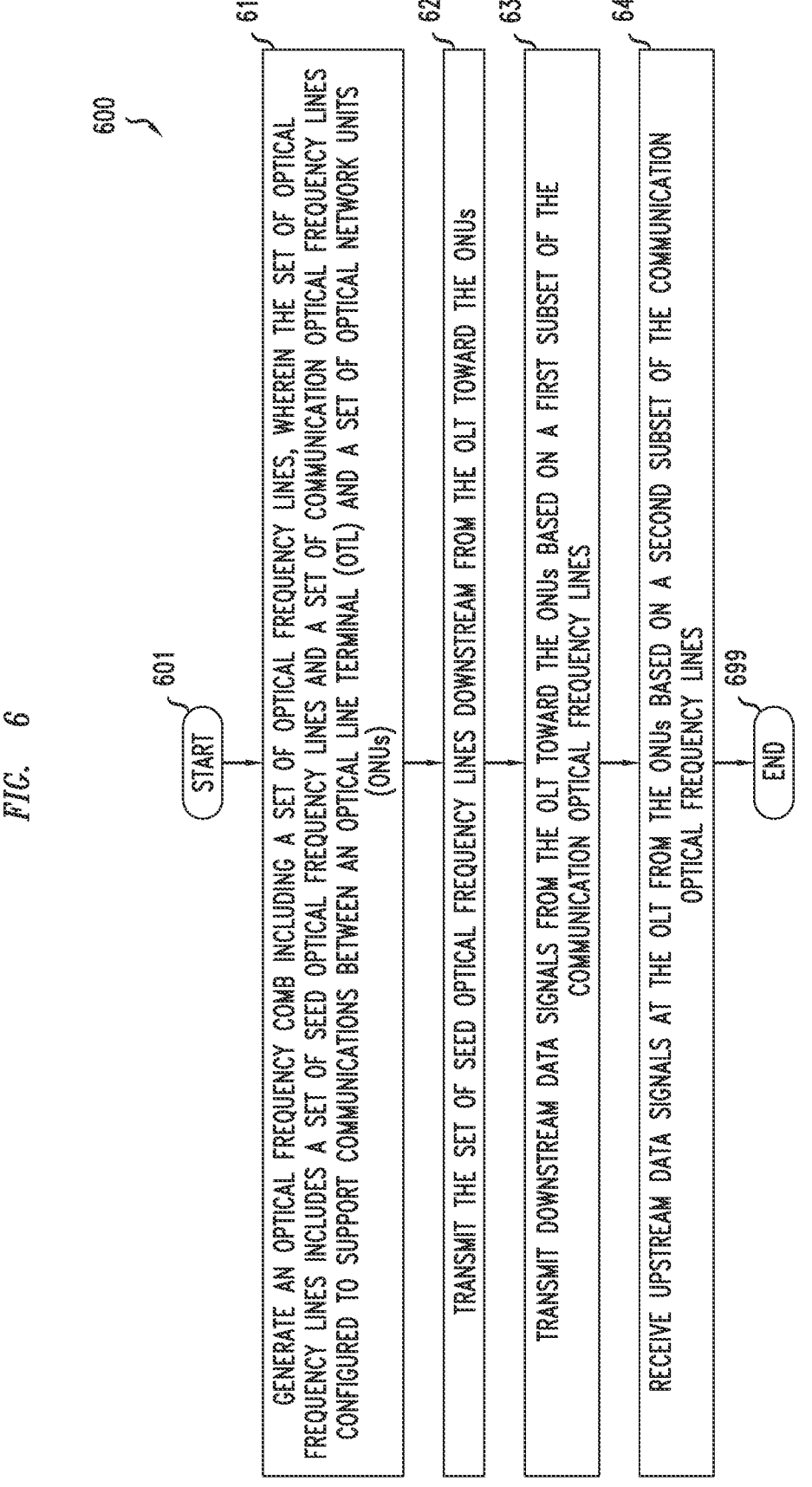

600

START 601

610
GENERATE AN OPTICAL FREQUENCY COMB INCLUDING A SET OF OPTICAL FREQUENCY LINES, WHEREIN THE SET OF OPTICAL FREQUENCY LINES INCLUDES A SET OF SEED OPTICAL FREQUENCY LINES AND A SET OF COMMUNICATION OPTICAL FREQUENCY LINES CONFIGURED TO SUPPORT COMMUNICATIONS BETWEEN AN OPTICAL LINE TERMINAL (OTL) AND A SET OF OPTICAL NETWORK UNITS (ONUs)

620
TRANSMIT THE SET OF SEED OPTICAL FREQUENCY LINES DOWNSTREAM FROM THE OLT TOWARD THE ONUs

630
TRANSMIT DOWNSTREAM DATA SIGNALS FROM THE OLT TOWARD THE ONUs BASED ON A FIRST SUBSET OF THE COMMUNICATION OPTICAL FREQUENCY LINES

640
RECEIVE UPSTREAM DATA SIGNALS AT THE OLT FROM THE ONUs BASED ON A SECOND SUBSET OF THE COMMUNICATION OPTICAL FREQUENCY LINES

END 699

FIG. 7

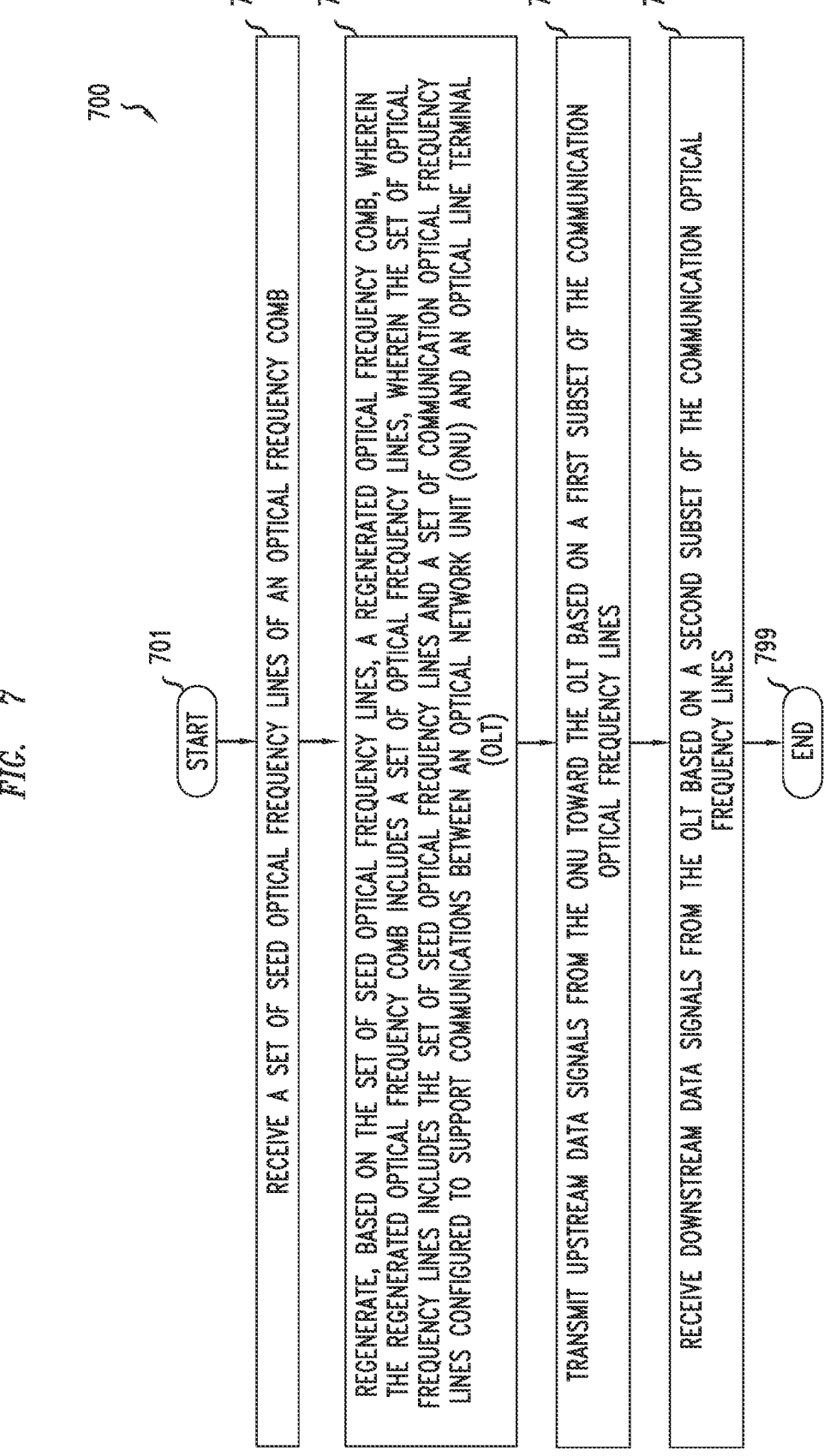

700

START — 701

RECEIVE A SET OF SEED OPTICAL FREQUENCY LINES OF AN OPTICAL FREQUENCY COMB — 710

REGENERATE, BASED ON THE SET OF SEED OPTICAL FREQUENCY LINES, A REGENERATED OPTICAL FREQUENCY COMB, WHEREIN THE REGENERATED OPTICAL FREQUENCY COMB INCLUDES A SET OF OPTICAL FREQUENCY LINES, WHEREIN THE SET OF OPTICAL FREQUENCY LINES INCLUDES THE SET OF SEED OPTICAL FREQUENCY LINES AND A SET OF COMMUNICATION OPTICAL FREQUENCY LINES CONFIGURED TO SUPPORT COMMUNICATIONS BETWEEN AN OPTICAL NETWORK UNIT (ONU) AND AN OPTICAL LINE TERMINAL (OLT) — 720

TRANSMIT UPSTREAM DATA SIGNALS FROM THE ONU TOWARD THE OLT BASED ON A FIRST SUBSET OF THE COMMUNICATION OPTICAL FREQUENCY LINES — 730

RECEIVE DOWNSTREAM DATA SIGNALS FROM THE OLT BASED ON A SECOND SUBSET OF THE COMMUNICATION OPTICAL FREQUENCY LINES — 740

END — 799

OPTICAL FREQUENCY COMB LOCKING FOR A FLEXIBLE PASSIVE OPTICAL NETWORK

TECHNICAL FIELD

Various example embodiments relate generally to communication systems and, more particularly but not exclusively, to supporting communications in optical communication systems.

BACKGROUND

Various communications technologies may be used to support communications in various types of communication systems.

SUMMARY

In at least some example embodiments, an apparatus includes an optical frequency comb generator configured to generate an optical frequency comb including a set of optical frequency lines, wherein the set of optical frequency lines includes a set of seed optical frequency lines and a set of communication optical frequency lines configured to support communications between an optical line terminal (OLT) and a set of optical network units (ONUs), wherein the apparatus is configured to transmit the set of seed optical frequency lines downstream from the OLT toward the ONUs, wherein the apparatus is configured to transmit downstream data signals from the OLT toward the ONUs based on a first subset of the communication optical frequency lines, wherein the apparatus is configured to receive upstream data signals at the OLT from the ONUs based on a second subset of the communication optical frequency lines. In at least some example embodiments, the set of seed optical frequency lines includes at least two optical frequency lines of the optical frequency comb. In at least some example embodiments, the set of optical frequency lines includes L optical frequency lines of the optical frequency comb, the set of seed optical frequency lines includes S optical frequency lines of the optical frequency comb, the first subset of the communication optical frequency lines includes D optical frequency lines of the optical frequency comb, and the second subset of the communication optical frequency lines includes U optical frequency lines of the optical frequency comb, and L=S+D+U. In at least some example embodiments, the first subset of the communication optical frequency lines includes D optical frequency lines of the optical frequency comb, the second subset of the communication optical frequency lines includes U optical frequency lines of the optical frequency comb, and D=U. In at least some example embodiments, the optical frequency comb includes a set of OLT comb teeth and a set of ONU comb teeth, the optical frequency comb is configured such that a first subset of the set of OLT comb teeth and each of a first subset of the set of ONU comb teeth are channels modulated with data and each of these sets includes at least one element, the optical frequency comb is configured such that each of a second subset of the ONU comb teeth will be an empty set or a subset of the first subset of the set of OLT comb teeth, the optical frequency comb is configured such that the second subset of the set of OLT comb teeth will be an empty set or a subset of the union of the first subsets of the set of ONU-k comb teeth over all k, and the optical frequency comb is configured such that the third subset of the set of OLT comb teeth will include at least two elements as the set of seed optical frequency lines. In at least some example embodiments, the apparatus is configured to provide the first subset of the communication optical frequency lines to a set of modulators as carrier signals for generation of the downstream data signals based on modulation of the first subset of the communication optical frequency lines with downstream data. In at least some example embodiments, the apparatus is configured to multiplex the seed optical frequency lines and the downstream data signals to form a multiplexed downstream signal for transmission from the OLT toward the ONUs. In at least some example embodiments, the apparatus is configured to provide the upstream data signals to a set of direct detection receivers for detection of the set of upstream data signals to recover upstream data. In at least some example embodiments, the apparatus is configured to provide the second subset of the communication optical frequency lines to a set of coherent receivers for detection of the upstream data signals based on application of the second subset of the communication optical frequency lines as local oscillators to recover upstream data. In at least some example embodiments, the set of seed optical frequency lines, the downstream data signals, and the upstream data signals are carried over an optical fiber. In at least some example embodiments, a method includes generating an optical frequency comb including a set of optical frequency lines, wherein the set of optical frequency lines includes a set of seed optical frequency lines and a set of communication optical frequency lines configured to support communications between an optical line terminal (OLT) and a set of optical network units (ONUs), transmitting the set of seed optical frequency lines downstream from the OLT toward the ONUs, transmitting downstream data signals from the OLT toward the ONUs based on a first subset of the communication optical frequency lines, and receiving upstream data signals at the OLT from the ONUs based on a second subset of the communication optical frequency lines. In at least some example embodiments, an apparatus includes means for generating an optical frequency comb including a set of optical frequency lines, wherein the set of optical frequency lines includes a set of seed optical frequency lines and a set of communication optical frequency lines configured to support communications between an optical line terminal (OLT) and a set of optical network units (ONUs), means for transmitting the set of seed optical frequency lines downstream from the OLT toward the ONUs, means for transmitting downstream data signals from the OLT toward the ONUs based on a first subset of the communication optical frequency lines, and means for receiving upstream data signals at the OLT from the ONUs based on a second subset of the communication optical frequency lines.

In at least some example embodiments, an apparatus includes an optical frequency comb regenerator configured to receive a set of seed optical frequency lines of an optical frequency comb and regenerate, based on the set of seed optical frequency lines, a regenerated optical frequency comb, wherein the regenerated optical frequency comb includes a set of optical frequency lines, wherein the set of optical frequency lines includes the set of seed optical frequency lines and a set of communication optical frequency lines configured to support communications between an optical network unit (ONU) and an optical line terminal (OLT), wherein the apparatus is configured to transmit upstream data signals from the ONU toward the OLT based on a first subset of the communication optical frequency lines, wherein the apparatus is configured to receive downstream data signals from the OLT based on a second subset of the communication optical frequency lines. In at least some example embodiments, the regenerated optical frequency comb includes a subset of the optical frequency comb, and the optical frequency comb is generated at a transmitter. In at least some example embodiments, the first subset of the communication optical frequency lines includes one or more optical frequency lines of the regenerated optical frequency comb. In at least some example embodiments, the second subset of the communication optical frequency lines includes one or more optical frequency lines of the regenerated optical frequency comb. In at least some example embodiments, the apparatus is configured to provide the first subset of the communication optical frequency lines to a set of modulators as carrier signals for generation of the upstream data signals based on modulation of the first subset of the communication optical frequency lines with upstream data. In at least some example embodiments, the apparatus is configured to provide the downstream data signals to a set of direct detection receivers for detection of the set of downstream data signals to recover downstream data. In at least some example embodiments, the apparatus is configured to provide the second subset of the communication optical frequency lines to a set of coherent receivers for detection of the downstream data signals based on application of the second subset of the communication optical frequency lines as local oscillators to recover downstream data. In at least some example embodiments, the set of seed optical frequency lines, the upstream data signals, and the downstream data signals are carried over an optical fiber. In at least some example embodiments, a method includes receiving a set of seed optical frequency lines of an optical frequency comb, regenerating, based on the set of seed optical frequency lines, a regenerated optical frequency comb, wherein the regenerated optical frequency comb includes a set of optical frequency lines, wherein the set of optical frequency lines includes the set of seed optical frequency lines and a set of communication optical frequency lines configured to support communications between an optical network unit (ONU) and an optical line terminal (OLT), transmitting upstream data signals from the ONU toward the OLT based on a first subset of the communication optical frequency lines, and receiving downstream data signals from the OLT based on a second subset of the communication optical frequency lines. In at least some example embodiments, an apparatus includes means for receiving a set of seed optical frequency lines of an optical frequency comb, means for regenerating, based on the set of seed optical frequency lines, a regenerated optical frequency comb, wherein the regenerated optical frequency comb includes a set of optical frequency lines, wherein the set of optical frequency lines includes the set of seed optical frequency lines and a set of communication optical frequency lines configured to support communications between an optical network unit (ONU) and an optical line terminal (OLT), means for transmitting upstream data signals from the ONU toward the OLT based on a first subset of the communication optical frequency lines, and means for receiving downstream data signals from the OLT based on a second subset of the communication optical frequency lines.

BRIEF DESCRIPTION OF THE DRAWINGS

The teachings herein can be readily understood by considering the following detailed description in conjunction with the accompanying drawings, in which:

FIG. 6 depicts an example embodiment of a method for use by an OLT for supporting communications between the OLT and a set of ONUs based on OFC locking;

FIG. 7 depicts an example embodiment of a method for use by an ONU for supporting communications between an OLT and the ONU based on OFC locking.

To facilitate understanding, identical reference numerals have been used herein, wherever possible, in order to designate identical elements that are common among the various figures.

DETAILED DESCRIPTION

Figure 1:
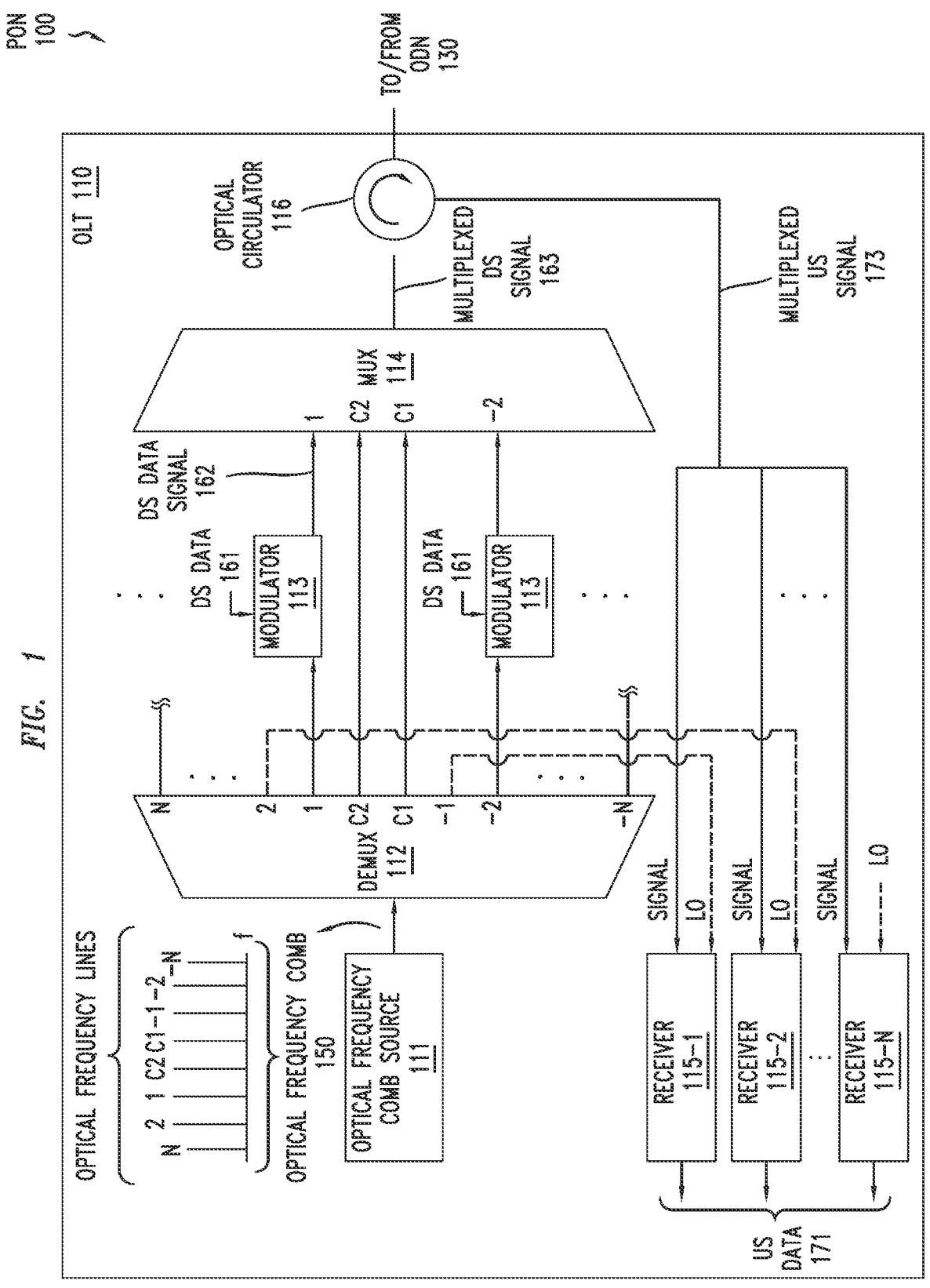
FIG. 1 depicts an example embodiment of a passive optical network (PON) configured to support communications between an optical line terminal (OLT) and a set of optical network units (ONUs) based on optical frequency comb (OFC) locking.
Figure 1:
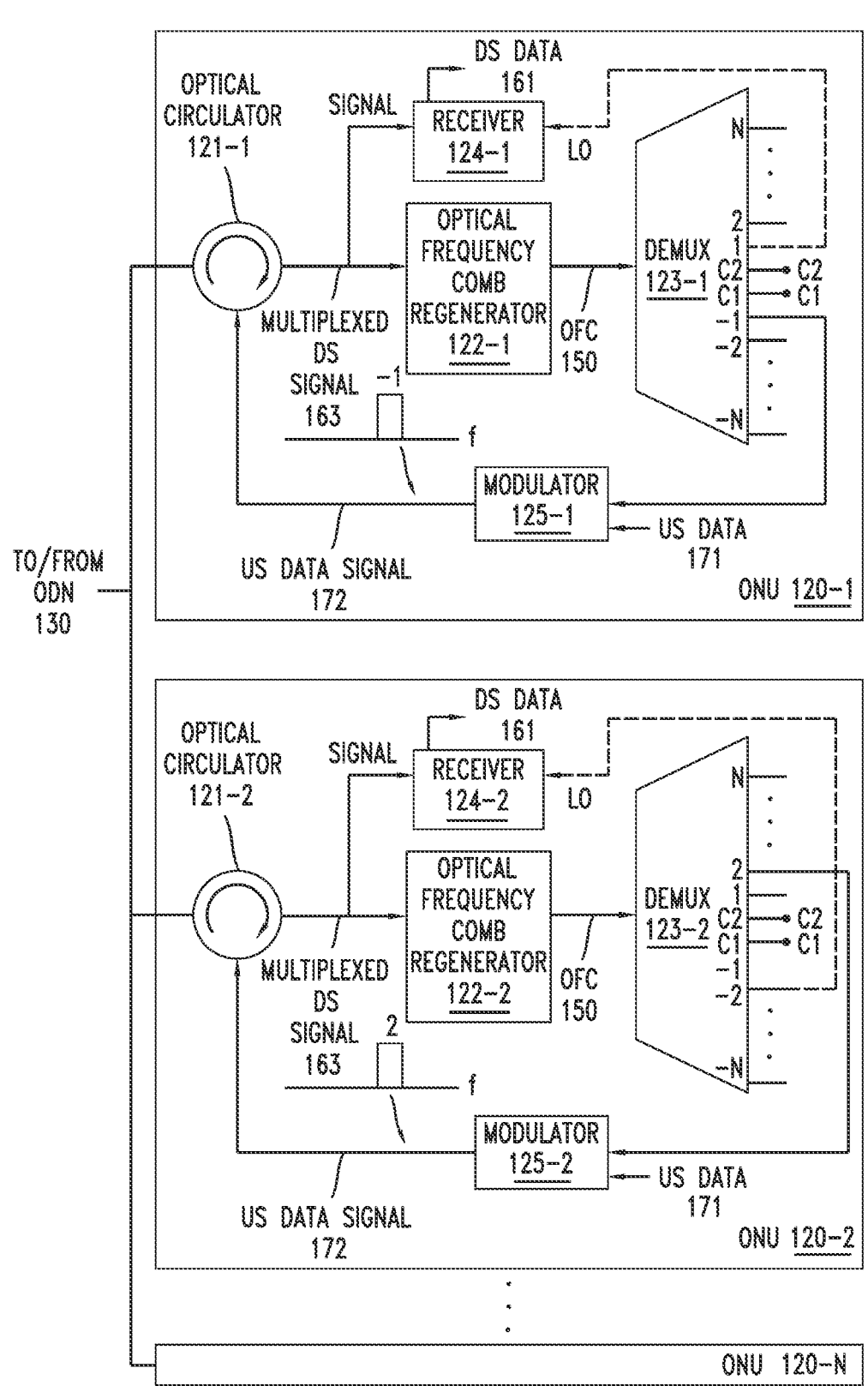

Various example embodiments for supporting optical communications in an optical communication system are presented herein. Various example embodiments for supporting optical communications in an optical communication system may be configured to use a comb-based approach to support communications within a passive optical network (PON). Various example embodiments may be configured to support communications within various types of PONs, including direct detection based PONs (e.g., single-channel or wavelength division multiplexed (WDM) PONs), coherent detection based PONs (e.g., single-channel or WDM PONs), or the like. In at least some example embodiments of the comb-based approach, an optical frequency comb (OFC) may be used to provide various signals for supporting communications within the PON (namely, for downstream communications from the OLT to the ONUs and for upstream communications from the ONUs to the OLT) based on locking of the OFC at the ONUs to the OFC at the OLT, thereby enabling efficient operation for the PON. In at least some example embodiments of the comb-based approach, such as where the comb-based approach is applied within a PON, an OFC may be used to provide the carrier signals for all communications within the PON (namely, for downstream communications from the OLT to the ONUs and for upstream communications from the ONUs to the OLT) with locking of the OFC at the ONUs to the OFC at the OLT ensuring that the carrier signals at the OLT and the ONUs are locked to different lines of the OFC for the downstream and the upstream, respectively, thereby enabling efficient operation for the PON. In at least some example embodiments of the comb-based approach, such as where the comb-based approach is applied within a PON, an OFC is used to provide the carrier signals and local oscillators (LOs) for all communications within the PON (namely, for downstream communications from the OLT to the ONUs and for upstream communications from the ONUs to the OLT) with locking of the OFC at the ONUs to the OFC at the OLT ensuring that the carrier signals and LOs at the OLT and the ONUs are locked to each other in both the downstream and the upstream, thereby enabling efficient operation for the PON. It will be appreciated that these and various other example embodiments and advantages or potential advantages of using a comb-based approach to provide a PON may be further understood by first considering various aspects of PONs.

PON is a fiber-optic telecommunications technology for delivering broadband network access to end customers. PON generally provides connectivity from a main data source to endpoints using a technique called passive optical splitting, while also supporting upstream communications from the endpoints. The evolution of PON has seen tremendous increases in data rates, starting from 0.622 Gbps (BPON) to 49.7664 Gbps (50G PON), which has been driven by significant increases in the number of Internet users as well as the introduction and widespread use of various high-bandwidth applications such as video streaming, online gaming and game streaming, augmented reality, and so forth. 50G PON continues to use intensity modulation and direct detection (IM-DD). The downstream and upstream use time-division multiplexing (TDM) and time-division multiple access (TDMA), respectively, for communicating with different ONUs. There are certain challenges to be solved in the 50G PON development including the design of high-speed and high sensitivity photodetectors, high-speed burst mode transimpedance amplifiers (TIAs), and the digital signal processing (DSP) that is needed to compensate for the transceiver and transmission impairments.

PON, while already realizing significant increases in supported data rate, will need to continue to evolve to support higher data rates expected to be needed in the future. For example, the next generation PON is expected to demand a much higher data rate than 50G PON. With the existing challenges in the development of 50G PON, wavelength division multiplexing and/or coherent systems seem to be a viable option. WDM-based PONs normally use an array of parallel data channels operating at different wavelength to achieve high data rates. However, such WDM-based PONs typically require expensive stable lasers, especially if high spectral efficiency is required. Coherent systems have improved sensitivity compared to direct detection systems due to the beating of the received signal with the LO. Coherent systems have been used successfully in other communication contexts (e.g., point-to-point fiber solutions, commercial long-haul systems, and so forth), making them an interesting technology for PON. However, in a PON context, there are additional problems that need to be addressed to transition PONs from IM-DD-based PONs to coherent PONs (e.g., rapid rescaling of analog-to-digital converter (ADC) range, and use of complex and power-intensive coherent DSP). These problems at least partially arise due to the fact that PON is expected to operate as a low-cost, low-power-consumption single fiber point-to-multi-point system. It will be appreciated that various example embodiments for using a comb-based approach to provide a PON may overcome at least some such problems.

Various example embodiments for using a comb-based approach to provide a direct-detection based PON may be based on use of an OFC that is generated at the OLT and reconstructed at the ONUs to enable locking of the signal carriers at the OLT and ONUs to one line of the OFC for ensuring that there is no crosstalk between the upstream and downstream signals and the signal carriers are aligned to desired filters in the PON. The OFC may include a set of optical frequency lines that includes a set of optical frequency lines used as seed lines that enable reconstruction of the OFC (or at least a relevant portion thereof) at each of the ONUs (e.g., a set of two or more OFC lines may be used to regenerate the locked OFC, or a portion thereof, at each of the ONUs, respectively), a set of optical frequency lines used to support downstream communications from the OLT to the ONUs (e.g., OFC lines used as carrier signals at the OLT for downstream data signals), and a set of optical frequency lines used to support upstream communications from the ONUs to the OLT (e.g., OFC lines used as carrier signals at the ONUs for upstream data signals). The optical frequency lines used as the seed lines may be sent downstream from the OLT to the ONUs without any modulation to enable reconstruction of the OFC (or portions thereof) at the ONUs. The reconstruction of the OFC at the ONUs using the seed lines enables the locking of the OFCs at the ONUs to the OFC at the OLT.

Various example embodiments for using a comb-based approach to provide a coherent detection based PON may be based on use of an OFC that is generated at the OLT and reconstructed at the ONUs to enable locking of the OFC at the ONUs to the OFC at the OLT for ensuring that the carrier signals and LOs are locked to each other in both the downstream and the upstream. The OFC may include a set of optical frequency lines that includes a set of optical frequency lines used as seed lines that enable reconstruction of the OFC (or at least a relevant portion thereof) at each of the ONUs (e.g., a set of two or more OFC lines may be used to regenerate the locked OFC at each of the ONUs), a set of optical frequency lines used to support downstream communications from the OLT to the ONUs (e.g., OFC lines used as carrier signals at the OLT for downstream data signals and as LOs at the ONUs for coherent reception of the downstream data signals at the ONUs), and a set of optical frequency lines used to support upstream communications from the ONUs to the OLT (e.g., OFC lines used as carrier signals at the ONUs for upstream data signals and as LOs at the OLT for coherent reception of the upstream signals at the OLT). The optical frequency lines used as the seed lines may be sent downstream from the OLT to the ONUs without any modulation to enable reconstruction of the OFC at the ONUs. The reconstruction of the OFC (or portions thereof) at the ONUs using the seed lines enables the locking of the OFCs at the ONUs to the OFC at the OLT.

Various example embodiments for using a comb-based approach to provide a WDM PON may be based on use of an OFC as follows. The OLT has an OFC source that is able to generate the OFC for use as a light source at the OLT, and optical frequency lines of the OFC are used at the OLT as carrier signals for downstream communications to the ONUs and, in the case of a coherent PON, as LOs for upstream communications from the ONUs. Each ONU has an OFC regenerator that is able to reconstruct the OFC (or at least a relevant portion thereof) used at the OLT as a regenerated OFC, and each ONU is able to use optical frequency lines of the regenerated OFC as the carrier signal for upstream communications to the OLT and, in the case of a coherent PON, as the LO for downstream communications from the OLT. The locking of the OFCs at the ONUs to the OFC at the OLT enables all of the carrier signals, and all of the LOs in the case of a coherent PON, to be locked to each other in both the downstream and the upstream, thereby enabling efficient operation for detection within the PON in both the downstream direction from the OLT to the ONUs and the upstream direction from the ONUs to the OLT.

Various example embodiments for using a comb-based approach to provide a PON may be used in combination with various multiplexing techniques and/or multiple access techniques (e.g., subcarrier multiplexing, time division multiplexing (TDM) and/or time division multiple access (TDMA), or the like) for various purposes (e.g., accommodating additional ONUs and/or supporting flexible data rates). For example, subcarrier multiplexing may be used by dividing each carrier into multiple subcarriers and using each subcarrier to support a respective ONU. For example, each carrier can support more than one ONU using TDM for downstream and/or TDMA for upstream. For example, each carrier may be divided into multiple subcarriers and each subcarrier may be shared among multiple ONUs using TDM for downstream and/or TDMA for upstream. It will be appreciated that such techniques enable ONUs to support sharing of optical frequency lines of the OFC in various ways that may accommodate additional ONUs and/or support flexible data rates. It will be appreciated that these and/or various other multiplexing and/or multiple access techniques may be applied within the context of a comb-based PON to accommodate additional ONUs, support flexible data rates, or the like, as well as various combinations thereof.

It will be appreciated that these and various other example embodiments of using a comb-based approach to provide a PON, and advantages or potential advantages of using a comb-based approach to provide a PON, may be further understood by way of reference to the various figures, which are discussed further below.

FIG. 1 depicts an example embodiment of a PON configured to support communications between an OLT and a set of ONUs based on OFC locking.

The PON 100 may be configured to provide network access to a set of customers, based on optical communications, in various contexts and based on various technologies. For example, the PON 100 may operate as a point-to-multipoint (P2MP) data distribution system configured to provide broadband network access over "the last mile" for customers (e.g., the final portion of a telecommunications network that supports communications for customers, including delivering communications to the customers and supporting communications from the customers). For example, the PON 100 may operate using various types of PON technologies and various PON standards (e.g., the G.9804 standard for 50G PON). For example, the PON 100 may be based on direct detection, coherent detection, or the like. It will be appreciated that the PON 100 may be used in various other contexts, configured based on various other PON technologies and/or PON standards, or the like, as well as various combinations thereof.

The PON 100 may include various communication elements configured to support optical communications. The PON 100 includes an optical line terminal (OLT) 110 and a set of optical network units (ONUs) 120-1-120-N (collectively, ONUs 120) connected via an optical distribution network (ODN) 130. The PON 100 may be configured to support downstream (DS) communications from the OLT

110 to the ONUs 120 via the ODN 130 and upstream (US) communications from the ONUs 120 to the OLT 110 via the ODN 130. The PON 100, as discussed further below, may be configured to support DS communications from the OLT 110 to the ONUs 120 and US communications from the ONUs 120 to the OLT 110 based on an OFC and based on locking of the OLT 110 and the ONUs 120 to the OFC. It will be appreciated that the PON 100 may include various other elements (which have been omitted for purposes of clarity).

The OLT 110 is configured to support communications between the ONUs 120 and one or more upstream networks (omitted for purposes of clarity). The OLT 110 may be located in a central location, such as a central office (CO) or other suitable location. For example, the one or more upstream networks may include one or more core communication networks configured to support communications of the OLT 110 and, thus, of the ONUs 120. For example, the one or more upstream networks may include the Internet, data center networks, enterprise networks, or the like, as well as various combinations thereof. For example, the OLT 110 may be configured to forward data received from the one or more upstream networks downstream toward the ONUs 120 via the ODN 130 and to forward data received from the ONUs 120 via the ODN 130 upstream toward the one or more upstream networks. The OLT 110, as discussed further below, may be configured to support DS communications to the ONUs 120 and US communications from the ONUs 120 based on an OFC and based on locking of the OLT 110 and the ONUs 120 to the OFC.

The ONUs 120 each are configured to support communications between the OLT 110 and one or more downstream networks or devices (omitted for purposes of clarity). The ONUs 120 may be located at respective user premises or other suitable locations. For example, the one or more downstream networks or devices for an ONU 120 may include one or more local area networks (LANs) of the customer, one or more communication devices of the customer (e.g., a modem, a router, a switch, a set top box, a smart television, a gaming system, a computer, a smartphone, or the like, as well as various combinations thereof). For example, an ONU 120 may be configured to forward data received from the OLT 110 via the ODN 130 downstream toward one or more downstream networks or devices and to forward data received from the one or more downstream networks or devices upstream toward the OLT 110 via the ODN 130. The ONUs 120, as discussed further below, may be configured to support DS communications from the OLT 110 and US communications to the OLT 110 based on an OFC and based on locking of the OLT 110 and the ONUs 120 to the OFC.

The ODN 130 may be a data distribution system configured to support communications between the OLT 110 and the ONUs 120, including DS communications from the OLT 110 to the ONUs 120 and US communications from the ONUs 120 to the OLT 110. The ODN 130, for purposes of clarity, is simply depicted as an optical fiber or set of optical fibers configured to support propagation of optical signals downstream from the OLT 110 to the ONUs 120 and upstream from the ONUs 120 to the OLT 110; however, it will be appreciated that the ODN 130 may be implemented using various components which may be arranged in various configurations. For example, the ODN 130 may include various passive optical components (e.g., optical fibers, couplers, splitters, and the like) which do not require power to distribute data signals between the OLT 110 and the ONUs 120. For example, the ODN 130 may be implemented using a branching configuration or other suitable P2MP configurations. It will be appreciated that the ODN 130 may include various other elements for supporting communications between the OLT 110 and the ONUs 120.

The PON 100 is configured to support communications between the OLT 110 and the ONUs 120 based on use of an optical frequency comb (OFC). Before describing the specific OFC used within the context of PON 100 (illustratively, the OFC 150 which is discussed in detail further below), a more general description of the OFC which may be used is provided.

In the generalized case, the OFC at the OLT (an example of which is provided as OFC 150 in FIG. 1) includes a set of OLT optical frequency lines (comb teeth) including $N_{OLT,C}$ teeth. A first subset of the set of OLT comb teeth including $N_{OLT,sig}$ comb teeth is used for downstream data transmission. A second subset of the set of OLT comb teeth including $N_{OLT,LO}$ lines is used as local oscillators for OLT coherent receivers. A third subset of the set of OLT comb teeth including $N_{OLT,S}$ comb teeth is used as remote comb seed lines. In the general case, the first subset of the set of OLT comb teeth and the third subset of the set of OLT comb teeth are disjoint. However, the union of the first subset of the set of OLT comb teeth and the third subset of the set of OLT comb teeth can be an overlapping set with the second subset of the set of OLT comb teeth.

In the generalized case, the OFC at each ONU (examples of which are provided as OFCs 150'-$k$ in FIG. 1) includes a set of ONU-k comb teeth including $N_{ONU-k,C}$ lines. A first subset of the set of ONU-k comb teeth including $N_{ONU-k,sig}$ comb teeth is used for upstream data transmission. A second subset of the set of ONU-k comb teeth including $N_{ONU-k,LO}$ lines is used as local oscillators for ONU coherent receivers.

In the generalized case, the descriptions above for the OFC at the OLT and the OFCs at the ONUs may be subject to the following set of restrictions. A first restriction may be that a first subset of the set of OLT comb teeth and each first subset of the set of ONU comb teeth are channels modulated with data and each of these sets will contain at least one element (i.e., at least one channel must be used on the OLT and each ONU). A second restriction may be that each of the second subset of the ONU comb teeth will be an empty set (all channels use direct detection at all ONUs) or a subset of the first subset of the set of OLT comb teeth (any number of downstream lines can be received coherently at some ONUs). A third restriction may be that the second subset of the set of OLT comb teeth will be an empty set (all channels use direct detection at OLT) or a subset of the union of all first subsets of the set of ONU-k comb teeth over all k (any number of upstream lines, including all, can be received coherently at OLT). A fourth restriction may be that the third subset of the set of OLT comb teeth will contain at least two elements (i.e., at least two seed lines need to be used).

The PON 100 is configured to support communications between the OLT 110 and the ONUs 120 based on use of an optical frequency comb (OFC) 150, which is one example of the generalized OFC described above which is being used for purposes of clarity to describe various aspects of communications between the OLT 110 and the ONUs 120. More specifically, the PON 100 of FIG. 1 presents a particular case of coherent detection in both upstream and downstream with two seed lines and equal numbers of upstream and downstream data channels at different frequencies, i.e., $N_{OLT,S}=2$, $N_{ONU-k,sig}=N_{ONU-k,LO}=1$, $N_{OLT,sig}=N_{OLT,LO}$, where (1) the union of all first subsets of the set of ONU-k comb teeth [ONU-k,sig] for all k is equal to the second subset of the set of OLT comb teeth [OLT,LO] (i.e., each OLT LO is used for reception of at least one ONU signal) and (2) the union of all second subsets of the set of ONU-k comb teeth [ONU-k,LO] for all k is equal to the first subset of the set of OLT comb teeth [OLT,sig] (i.e., each downstream signal is received by at least one ONU).

The OFC 150 is generated at the OLT 110 and at least partially reconstructed at the ONUs 120 to enable locking of the OFC 150 at the OLT 110 to regenerated versions of the OFC 150' at the ONUs 120 (where it will be appreciated that each ONU 120 may regenerate its own version of the OFC 150' such that the regenerated versions of the OFC 150' may be the same or may vary across the ONUs 120 and, thus, to ensure that the carrier signals, and LOs where coherent detection is used, are locked to each other in both the downstream direction and the upstream direction. It will be appreciated that the use of the OFC 150 at the OLT 110 (and the regenerated OFCs 150' at the ONUs 120) to support communications within the PON 100 may be further understood by first considering various characteristics of the OFC 150 generated at the OLT 110.

The OFC 150 includes 2(N+1) optical frequency lines. The optical frequency lines of the OFC 150 may be indexed as: $[-N, -N+1, \ldots, -2, -1, C1, C2, 1, 2, \ldots, N-1, N]$. The two center optical frequency lines (denoted as C1 and C2), which are referred to more generally herein as two seed optical frequency lines (C1 and C2) since the two seed optical frequency lines do not necessarily need to be the optical frequency lines at the center of the OFC 150, are sent from the OLT 110 to the ONUs 120 unmodulated for use by the ONUs 120 as seeds to reconstruct the regenerated OFCs 150' at the ONUs 120, respectively. The 2N optical frequency lines other than the two seed optical frequency lines (C1 and C2) may be assigned in various ways for use as carrier signals, and LOs where coherent detection is used, for supporting DS communications from the OLT 110 to the ONUs 120 and US communications from the ONUs 120 to the OLT 110.

In at least some example embodiments, a first subset of the 2N optical frequency lines other than the two seed optical frequency lines (C1 and C2) may be assigned for use in DS communications from the OLT 110 to the ONUs 120 and a second subset of the 2N optical frequency lines other than the two seed optical frequency lines (C1 and C2) may be assigned for use in US communications from the ONUs 120 to the OLT 110. In at least some example embodiments, as primarily presented in FIG. 1, the two subsets of the 2N optical frequency lines may include equal numbers of optical frequency lines (namely, D lines for the DS direction and U lines for the US direction, such that D=U=N); however, it will be appreciated that, in at least some example embodiments, the two subsets of the 2N optical frequency lines may include unequal numbers of optical frequency lines (e.g., D lines for downstream and U lines for upstream where D+U=2N and D≠U).

In at least some example embodiments (as illustrated in FIG. 1), for example, the N optical frequency lines of the OFC 150 with indices $-n(-1)^n$ (N total lines, where $n \in [1, \ldots, N]$) are used for DS communications from the OLT 110 to the ONUs 120 (namely, as DS carrier signals at the OLT 110 and, in the case of coherent detection, as LOs for coherent receivers at the ONUs 120) and the N optical frequency lines of the OFC 150 with indices $n(-1)^n$ (N total lines, where $n \in [1, \ldots, N]$) are used for US communications from the ONUs 120 to the OLT 110 (namely, as US carriers at the ONUs 120 and, in the case of coherent detection, as LOs for coherent receivers at the OLT 110).

In at least some example embodiments (omitted from FIG. 1 for purposes of clarity), for example, the N optical frequency lines of the OFC 150 with indices $n(-1)^n$ may be used for DS communications from the OLT 110 to the ONUs 120 (namely, as DS carrier signals at the OLT 110 and, in the case of coherent detection, as LOs for coherent receivers at the ONUs 120) and the N optical frequency lines of the OFC 150 with indices $-n(-1)^n$ may be used for US communications from the ONUs 120 to the OLT 110 (namely, as US carriers at the ONUs 120 and, in the case of coherent detection, as LOs for coherent receivers at the OLT 110).

In at least some example embodiments (omitted from FIG. 1 for purposes of clarity), for example, the N optical frequency lines of the OFC 150 with negative indices may be used for DS communications from the OLT 110 to the ONUs 120 (namely, as DS carrier signals at the OLT 110 and, in the case of coherent detection, as LOs for coherent receivers at the ONUs 120) and the N optical frequency lines of the OFC 150 with positive indices may be used for US communications from the ONUs 120 to the OLT 110 (namely, as US carriers at the ONUs 120 and, in the case of coherent detection, as LOs for coherent receivers at the OLT 110).

It will be appreciated that the optical frequency lines of the OFC 150 may be assigned in various other ways (e.g., selecting any two optical frequency lines of the available optical frequency lines of the OFC 150 for use as the seed optical frequency lines, selecting any N of the 2N available optical frequency lines of the OFC 150 after selection of the seed optical frequency lines for use to support DS communications, selecting any N of the 2N available optical frequency lines of the OFC 150 after selection of the seed optical frequency lines for use to support US communications, or the like, as well as various combinations thereof) for supporting DS communications and US communications within the PON 100.

It will be appreciated that, although primarily presented herein with respect to use of specific numbers and locations of the optical frequency lines of the OFC 150 as the seed optical frequency lines (namely, the pair of optical frequency lines located at the center of the OFC 150), the set of seed optical frequency lines of the OFC 150 used to support locking of the OFC 150 at the OLT 110 with the regenerated OFCs 150' at the ONUs 120, respectively, may include other numbers of the optical frequency lines (e.g., using three of the optical frequency lines of the OFC 150 as seed optical frequency lines, using six of the optical frequency lines of the OFC 150 as seed optical frequency lines, or the like), may utilize optical frequency lines located at other positions within the OFC 150, or the like, as well as various combinations thereof.

It will be appreciated that, although primarily presented herein with respect to use of an OFC 150 that includes an even number of optical frequency lines, in at least some example embodiments the OFC 150 may include an odd number of optical frequency lines.

The OLT 110 is configured to support communications within the PON 100 based on use of the OFC 150. As depicted in FIG. 1, the OLT 110 includes an OFC source 111, a demultiplexer 112, a set of modulators 113, a multiplexer 114, a set of receivers 115-1 to 115-N (collectively, receivers 115), and an optical circulator 116. These components of the OLT 110 are configured to cooperate in a manner for using the OFC 150 generated by the OFC source 111 at the OLT 110 to support transmission of DS communications from the OLT 110 to the ONUs 120 and, in the case of coherent reception at the OLT 110, coherent reception of US communications from the ONUs 120 at the OLT 110. These components of the OLT 110 are configured to cooperate in a manner for supporting locking of the respective OFCs 150' reconstructed at the ONUs 120 to the corresponding OFC 150 generated by the OFC source 111 at the OLT 110. It will be appreciated that the OLT 110 may include various other components which may be used to support communications within the PON 100.

The OFC source 111 generates the OFC 150 at the OLT 110, such that the OFC 150 is used as a light source at the OLT 110. The OFC 150 generated at the OLT 110 is used to support DS communications from the OLT 110 to the ONUs 120 and, in the case of coherent reception at the OLT 110, US communications from the ONUs 120 to the OLT 110. The OFC source 111 of the OLT 110 may be implemented in various ways. For example, the OFC source 111 may be implemented as an electro-optic (EO) comb, a soliton-based Kerr micro-resonator, a Quantum-dash mode-locked laser a gain-switched semiconductor laser, or the like. It will be appreciated that the OFC source 111 of the OLT 110 may be implemented in various other ways.

The OFC source 111 provides the OFC 150 to the demultiplexer 112, which demultiplexes the OFC to separate the (2N+2) optical frequency lines of the OFC 150. The demultiplexer 112 may be implemented in various ways. For example, the demultiplexer 112 may be implemented using passive splitters followed by optical injection locking (OIL), tunable filters, an array-waveguide grating (AWG), or the like. It will be appreciated that the demultiplexer 112 may be implemented in various other ways.

After demultiplexing of the OFC 150 by the demultiplexer 112, the two seed optical frequency lines (C1 and C2) which are used for reconstruction of the regenerated OFCs 150' at the ONUs 120, respectively, are passed from the demultiplexer 112 to the multiplexer 114, without modulation, for multiplexing with each other and with signals transporting DS data 161 from the OLT 110 to the ONUs 120 (illustratively, the DS data signals 162 generated based on modulation of carrier signals with the DS data 161 at the OLT 110 as discussed further below) before propagation downstream toward the ONUs 120. This ensures that the two seed optical frequency lines may be used at the ONUs 120 for reconstructing the regenerated OFCs 150' at the ONUs 120, respectively.

After demultiplexing of the OFC 150 by the demultiplexer 112, the N optical frequency lines of the OFC 150 being used as carrier signals for DS transmission (namely, in the example of FIG. 1, the optical frequency lines with indices $-n(-1)^n$) are provided to the set of modulators 113 for modulation of the DS data 161 onto the carrier signals to form the DS data signals 162 for delivery of the DS data 161 to ONUs 120. In the example of FIG. 1, for purposes of clarity, only two of the N optical frequency lines being used as DS carrier signals and, thus, only two of the modulators 113 being used to modulate the DS data 161 onto those two optical frequency lines, are depicted (illustratively, the optical frequency lines with indices "−2" and "1" associated with ONU 120-1 and ONU 120-2, respectively). The N DS data signals 162 from the modulators 113 are provided from the modulators 113 to the multiplexer 114 for multiplexing with each other and with two seed optical frequency lines (C1 and C2) before propagation downstream toward the ONUs 120.

In the case in which coherent detection is used for upstream reception at the OLT 110, after demultiplexing of the OFC 150 by the demultiplexer 112, the N optical frequency lines of the OFC 150 being used as LOs for upstream reception (namely, in the example of FIG. 1, the optical frequency lines with indices $n(-1)^n$) are provided to the N receivers 115-1 to 115-N, respectively, for use as LOs to support coherent reception of signals transporting US data 171 from the ONUs 120 to the OLT 110 (illustratively, the US data signals 172 generated based on modulation of carrier signals with the US data 171 at the ONUs 120 as discussed further below). In this case, the receivers 115 are coherent receivers. In the example of FIG. 1, for purposes of clarity, only two of the N optical frequency lines being used as LOs and, thus, only two of the receivers 115 being used for coherent reception of US communications, are depicted (illustratively, the optical frequency lines with indices "−1" and "2").

The OLT 110, as indicated above, is configured to support transmission of DS data from the OLT 110 to the ONUs 120 based on a subset of the optical frequency lines of the OFC 150. The multiplexer 114 multiplexes the two seed optical frequency lines (C1 and C2) and the N DS data signals 162 from the modulators 113 to form a multiplexed DS signal 163 and provides the multiplexed DS signal 163 to the optical circulator 116 for downstream transmission from the OLT 110 to the ONUs 120 via the ODN 130. In the example of FIG. 1, the DS data signals 162 are generated based on the optical frequency lines with indices "−2" and "1" and, thus, as discussed further with respect to the operation of the ONUs 120, in the case in which coherent reception is used at the ONUs 120 these are the optical frequency lines of the regenerated OFCs 150' used at the ONUs 120, respectively, to support coherent reception of these DS data signals 162 from the OLT 110 to recover the DS data 161. It will be appreciated that other ones of the optical frequency lines of the OFC 150 may be used by the OLT 110 for transmission of data toward other ONUs 120.

The OLT 110, as indicated above, is configured to support reception of US communications from the ONUs 120. The OLT 110 may support reception of US communications from the ONUs 120 based on use of direct detection or coherent detection at the receivers 115. In the case of direct detection, the receivers 115 receive the US data signals 172 and process the US data signals 172 to recover the US data 171 transmitted by the ONUs 120, without use of the optical frequency lines of the OFC 150 as LOs at the receivers 115. In the case of coherent detection, as discussed further below, the receivers 115 are coherent receivers that use optical frequency lines of the OFC 150 as LOs to process the US data signals 172 to recover the US data 171 transmitted by the ONUs 120.

The OLT 110, as indicated above, may be configured to support coherent reception of US communications from the ONUs 120 to the OLT 110 based on a subset of the optical frequency lines of the OFC 150. The OLT 110 receives US data signals 172 from the ONUs 120 via the ODN 130. The optical circulator 116 receives the US data signals 172 from the ONUs 120 and directs the US data signals 172 to the receivers 115. The receivers 115 receive the US data signals 172 from the ONUs 120 and use the optical frequency lines of the OFC 150 which are received from the demultiplexer 112 as LOs for supporting coherent reception of the US data signals 172 from the ONUs 120 to recover the US data 171 transmitted by the ONUs 120. In the example of FIG. 1, the US data signals 172 are transported based on the optical frequency lines with indices "−1" and "2" and, thus, as discussed further with respect to the operation of the ONUs 120, these are the optical frequency lines of the OFC 150 used as LOs at the OLT 110 to support coherent reception of the US data signals 172 from the ONUs 120. It will be appreciated that other ones of the optical frequency lines of the OFC 150 may be used by the OLT 110 for coherent reception of US data 171 from other ONUs 120.

In this manner, the OLT 110 uses the OFC 150 to support transmission of DS communications to the ONUs 120 and, optionally, to support coherent reception of US communications from the ONUs 120.

The ONUs 120 are configured to support communications within the PON 100 based on use of the OFC 150. As depicted in FIG. 1, each of the ONUs 120 includes an optical circular 121 (illustratively, optical circulators 121-1 to 121-N of the ONUs 120-1 to 120-N, respectively), an OFC regenerator 122 (illustratively, OFC regenerators 122-1 to 122-N of the ONUs 120-1 to 120-N, respectively), a demultiplexer 123 (illustratively, demultiplexers 123-1 to 123-N of the ONUs 120-1 to 120-N, respectively), a receiver 124 (illustratively, receivers 124-1 to 124-N of the ONUs 120-1 to 120-N, respectively), and a modulator 125 (illustratively, modulators 125-1 to 125-N of the ONUs 120-1 to 120-N, respectively). These components of an ONU 120 are configured to cooperate in a manner for using the regenerated OFC 150' recovered at the ONU 120 to support transmission of US communications from the ONU 120 to the OLT 110 and, in the case of coherent reception at the ONU 120, coherent reception of DS communications from the OLT 110 to the ONU 120. These components of an ONU 120 are configured to cooperate in a manner for supporting locking of the regenerated OFC 150' reconstructed at the ONU 120 to the OFC 150 generated at the OLT 110. It will be appreciated that each of the ONUs 120 may include various other components which may be used to support communications within the PON 100.

At an ONU 120, the optical circular 121 receives the multiplexed DS signal 163 from the OLT 110 and directs the multiplexed DS signal 163 to both the OFC regenerator 122 and the receiver 124. The multiplexed DS signal includes the two seed optical frequency lines (C1 and C2) of the OFC 150 generated at the OLT 110 and the N DS data signals 162, from the modulators 113 of the OLT 110, which are transporting the DS data 161 from the OLT 110 to the ONU 120.

The OFC regenerator 122 at an ONU 120 receives the multiplexed DS signal 163 from the optical circulator 121 and recovers the corresponding regenerated OFC 150' based on the two seed optical frequency lines (C1 and C2) received as part of the multiplexed DS signal 163 from the OLT 110. The OFC regenerator 122 extracts the seed optical frequency lines (C1 and C2) from the multiplexed DS signal 163, for example, using an arrayed waveguide grating (AWG), using splitters followed by an array of optical filters or an array of optically injection-locked (OIL) sources, or the like, as well as various combinations thereof. The OFC regenerator 122 may recover the regenerated OFC 150' based on the frequency separation between the seed optical frequency lines (C1 and C2) extracted from the multiplexed DS signal 163 from the OLT 110. The OFC regenerator 122 may recover the regenerated OFC 150' by regenerating the full OFC 150 of the OLT 110 using the two seed optical frequency lines (C1 and C2) of the OFC 150 or by regenerating a portion of the OFC 150 of the OLT 110 using the two seed optical frequency lines (C1 and C2) of the OFC 150.

The OFC regenerator 122 at an ONU 120, in other words, may regenerate the regenerated OFC 150' such that the regenerated OFC 150' is the full OFC 150 that was generated at the OLT 110 or such that the regenerated OFC 150' is only a portion of the full OFC 150 that was generated at the OLT 110 (e.g., the ONU 120 may regenerate only a subset of the OFC 150 that includes only those optical frequency lines of the OFC 150 needed by the ONU 120 to support communications at the ONU 120). For example, where the OFC 150 generated by the OLT 110 includes 22 optical frequency lines (−10, . . . , −1, C2, C1, 1, . . . , 10) and the ONU 120 is performing direct detection of DS data signals and using optical frequency line with index 10 for transmission of US data signals, the ONU 120 may regenerate the regenerated OFC 150' such that the regenerated OFC 150' includes all 22 of the optical frequency lines (i.e., the full OFC 150 from the OLT 110 is regenerated). For example, where the OFC generated by the OLT 110 includes 22 optical frequency lines (−10, . . . , −1, C2, C1, 1, . . . , 10) and the ONU 120 is using optical frequency line with index −3 for coherent reception of DS data signals and using optical frequency line with index 4 for transmission of US data signals, the ONU 120 may regenerate the regenerated OFC 150' such that the regenerated OFC 150' includes only 10 of the 22 optical frequency lines (i.e., only part of OFC 150 from the OLT 110 is regenerated, with the regenerated OFC 150' including optical frequency lines (−4, . . . , −1, C2, C1, 1, . . . , 4)).

The OFC regenerator 122 at an ONU 120 may regenerate the regenerated OFC 150' in various ways. For example, the OFC generator 122 may regenerate the regenerated OFC 150' from the two seed optical frequency lines (C1 and C2) using an OIL stage where the two seed optical frequency lines (C1 and C2) are regenerated and then launching the two seed optical frequency lines (C1 and C2) into a non-linear medium (e.g., semiconductor optical amplifier (SOA), a highly-nonlinear fiber, a silicon nitride waveguide, or the like) to reconstruct the regenerated OFC 150'. For example, the OFC regenerator 122 may regenerate the regenerated OFC 150' by regenerating the two seed optical frequency lines (C1 and C2) and using the two seed optical frequency lines (C1 and C2) in combination with an electrical feedback loop to drive an EO OFC to reconstruct the regenerated OFC 150'. It will be appreciated that the regeneration of the OFC regenerated 150' from the two seed optical frequency lines (C1 and C2) at the ONU 120 may be implemented in various other ways.

The OFC regenerator 122 provides the regenerated OFC 150' to the demultiplexer 123, which demultiplexes the regenerated OFC 150' to separate the (2N+2) optical frequency lines of the OFC 150. The demultiplexer 123 may be implemented in various ways. For example, the demultiplexer 123 may be implemented using passive splitters followed by OIL, tunable filters, an AWG, or the like. It will be appreciated that the demultiplexer 123 may be implemented in various other ways.

After demultiplexing of the regenerated OFC 150' by the demultiplexer 123, the two seed optical frequency lines (C1 and C2) which were used for regeneration of the regenerated OFC 150' at the ONU 120 may be dropped by the demultiplexer 123 since the two seed optical frequency lines are no longer needed at the ONU 120.

After demultiplexing of the regenerated OFC 150' by the demultiplexer 123, the N optical frequency lines of the OFC 150 which are not being used by the OLT 110 for DS communications from the OLT 110 to the ONUs 120 (namely, in the example of FIG. 1, the optical frequency lines with indices $n(-1)^n$) are available for use as carrier signals for transmission of US data 171 from the ONUs 120 to the OLT 110 (with different ones of the optical frequency lines being used as carrier signals on different ones of the ONUs 120, respectively). In the example of FIG. 1, for purposes of clarity, only two of the N optical frequency lines being used as US carrier signals and, thus, only two of the modulators 125 being used to modulate the US data 171 onto those two optical frequency lines, are depicted (illustratively, the optical frequency lines with indices "−1" and "2", where the optical frequency line with index "−1" is being used as the carrier signal by the modulator 125-1 of ONU 120-1 and the optical frequency line with index "1" is being used as the carrier signal by the modulator 125-2 of ONU 120-2).

In the case in which coherent detection is used for downstream reception at the ONU 120, after demultiplexing of the regenerated OFC 150' by the demultiplexer 123, the N optical frequency lines of the regenerated OFC 150' being used as carrier signals for DS transmission (namely, in the example of FIG. 1, the optical frequency lines with indices $-n(-1)^n$) are available for use as LOs (with different ones of the optical frequency lines being used as LOs on different ones of the ONUs 120, respectively) to support coherent reception of the signals transporting DS data 161 from the OLT 110 to the ONU 120 (illustratively, the DS data signals 162 generated based on modulation of carrier signals with the DS data 161 at the OLT 110 as discussed further below). In this case, the receivers 124 are coherent receivers. In the example of FIG. 1, for purposes of clarity, only two of the N optical frequency lines being used as DS carrier signals and, thus, only two of ONUs 120 performing coherent reception of the DS data signals 162, are depicted (illustratively, the optical frequency lines with indices "−2" and "1", where the optical frequency line with index "1" is being used as the LO for the receiver 124-1 of ONU 120-1 and the optical frequency line with index "−2" is being used as the LO for the receiver 124-2 of ONU 120-2). At an ONU 120, as indicated above, is configured to support reception of DS communications from the OLT 110. The ONU 120 may support reception of DS communications from the OLT 110 based on use of direct detection or coherent detection at the receiver 124. In the case of direct detection, the receiver 124 receives the DS data signal 162 from the OLT 110 and processes the DS data signal 162 to recover the DS data 161 transmitted by the OLT 110, without use of the optical frequency lines of the regenerated OFC 150' as an LO at the receiver 124. In the case of coherent detection, as discussed further below, the receiver 124 is a coherent receiver that uses an optical frequency line of the regenerated OFC 150' (corresponding to the optical frequency line of the OFC 150 that was used at the carrier signal at the OLT 110) as an LO to process the DS data signal 162 to recover the DS data 161 transmitted by the OLT 110.

At an ONU 120, as indicated above, the ONU 120 may be configured to support coherent reception of DS communications at the ONU 120 from the OLT 110 based on one of the optical frequency lines of the regenerated OFC 150'. The optical circulator 121 receives the multiplexed DS signal 163 and directs the multiplexed DS signal 163 to the receiver 124. The demultiplexer 123 selects one of the optical frequency lines of the regenerated OFC 150' to be used as the LO for coherent reception at the ONU 120 and provides the selected optical frequency line of the regenerated OFC 150' to the receiver 124. The receiver 124 receives the multiplexed DS signal 163 and uses the selected optical frequency line of the regenerated OFC 150' from the demultiplexer 123 as an LO to support coherent reception of the DS data signal 162 from the OLT 110 and recover the DS data 161 transmitted by the OLT 110 and intended for that ONU 120. In the example of FIG. 1, the DS data signals 162 are based on the optical frequency lines with indices "−2" and "1" (illustratively, the ONU 120-1 uses the optical frequency line with index "1" and the ONU 120-2 uses the optical frequency line with index "−2") and, thus, as discussed further with respect to the operation of the OLT 110, these are the optical frequency lines used at the OLT 110 to support coherent transmission of the DS data 161 from the OLT 110 to the ONUs 120-1 and 120-2. It will be appreciated that other ones of the optical frequency lines of the regenerated OFC 150' may be used by other ONUs 120 for coherent reception of DS data 161 from the OLT 110.

At an ONU 120, as indicated above, the ONU 120 is configured to support US communications from the ONU 120 to the OLT 110 based on one of the optical frequency lines of the regenerated OFC 150'. The demultiplexer 123 selects one of the optical frequency lines of the regenerated OFC 150' to be used as the carrier signal for upstream transmission at the ONU 120 and provides the selected optical frequency line of the regenerated OFC 150' to the modulator 125. The modulator 125 receives US data 171 to be transmitted by the ONU 120 to the OLT 110 and modulates the US data 171 onto the selected optical frequency line of the regenerated OFC 150' to form the US data signal 172 for upstream transmission toward the OLT 110. The modulator 125 provides the US data signal 172 to the circulator 121 for upstream transmission from the ONU 120 to the OLT 110 via the ODN 130. In the example of FIG. 1, the US data signals 172 are based on the optical frequency lines with indices "−1" and "2" (illustratively, the ONU 120-1 uses the optical frequency line with index "−1" and the ONU 120-2 uses the optical frequency line with index "2") and, thus, as discussed further with respect to the operation of the OLT 110, in the case in which coherent reception is used at the OLT 110 these are the optical frequency lines used at the OLT 110 to support coherent reception of these US data signals 172 from the ONUs 120-1 and 120-2 to recover the US data 171 transmitted by the ONUs 120-1 and 120-2. It will be appreciated that other ones of the optical frequency lines of the regenerated OFC 150' may be used by other ONUs 120 for upstream transmission of data toward the OLT 110.

In this manner, each of the ONUs 120 uses the regenerated OFC 150' to support transmission of US communications to the OLT 110 and, optionally, coherent reception of DS communications from the OLT 110.

It will be appreciated that, although primarily presented herein with respect to example embodiments in which each ONU 120 uses a single optical frequency line of the regenerated OFC 150' for reception of DS communications from the OLT 110 and uses a single optical frequency line of the regenerated OFC 150' for transmission of US communications to the OLT 110, in at least some example embodiments one or more of the ONUs 120 may use multiple optical frequency lines of the regenerated OFC 150' for reception of DS communications from the OLT 110, may use multiple optical frequency lines of the regenerated OFC 150' for transmission of US communications to the OLT 110, or the like, as well as various combinations thereof.

Figure 2:
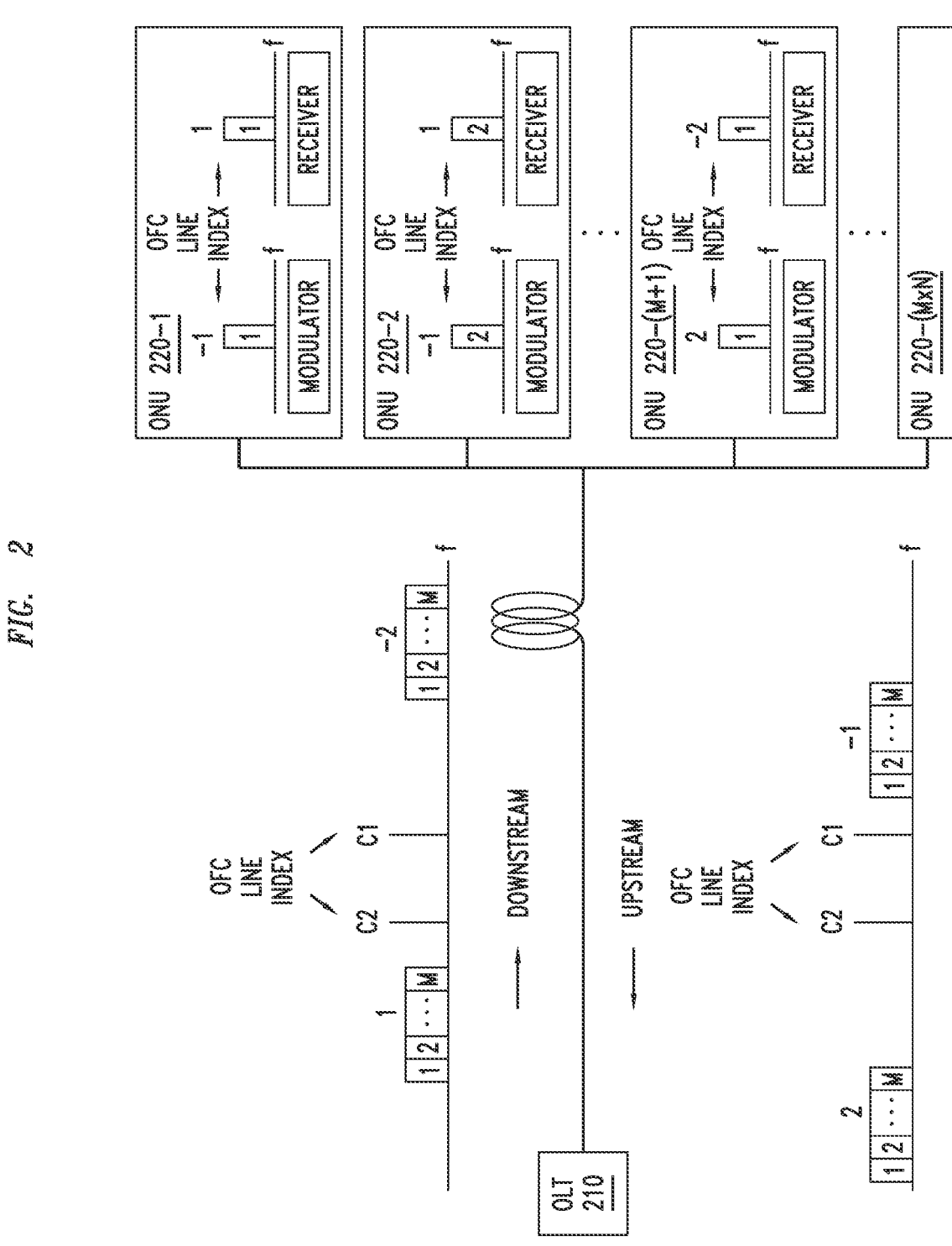
FIG. 2 depicts an example embodiment of a PON configured to support communications between an OLT and a set of ONUs based on OFC locking and use of subcarrier multiplexing.

FIG. 2 depicts an example embodiment of a PON configured to support communications between an OLT and a set of ONUs based on OFC locking and use of subcarrier multiplexing. The PON 200 of FIG. 2 is similar to the PON 100 of FIG. 1, with the exception that subcarrier multiplexing has been applied. As illustrated in FIG. 2, the PON 200 includes an OLT 210 and M×N ONUs (illustratively, ONU 220-1 to ONU 220-(M×N)). As illustrated in FIG. 2, M subcarriers are supported for each optical frequency line of the OFC based on subcarrier multiplexing. For example, for DS communication from the OLT 210 toward the ONUs 220, the optical frequency line with index "1" is being used to support DS communications to M different ONUs 220 (illustratively, using subcarrier "1" on optical frequency line "1" for ONU 220-1, using subcarrier "2" on optical frequency line "1" for ONU 220-2, and so forth, with the optical frequency line "1" now able to support DS communication to up to M ONUs 220 using the M different subcarriers). For example, for US communication from the ONUs 220 toward the OLT 210, the optical frequency line with index "−1" is being used to support US communications from M different ONUs 220 (illustratively, using subcarrier "1" on optical frequency line "−1" for ONU 220-1, using subcarrier "2" on optical frequency line "−1" for ONU 220-2, and so forth, with the optical frequency line "−1" now able to support US communications for up to M ONUs 220 using the M different subcarriers). Accordingly, rather than supporting only N ONUs as in the PON 100 of FIG. 1, the PON 200 is able to support a total of N×M ONUs 220 (with each pair of the N optical frequency lines of the OFC supporting M ONUs 220 based on division of each optical frequency line of the OFC into M subcarriers). It will be appreciated that, although primarily presented with respect to use of the same number of subcarriers in the DS and the US (namely, M subcarriers), different numbers of subcarriers may be used in the DS and the US.

Figure 3:
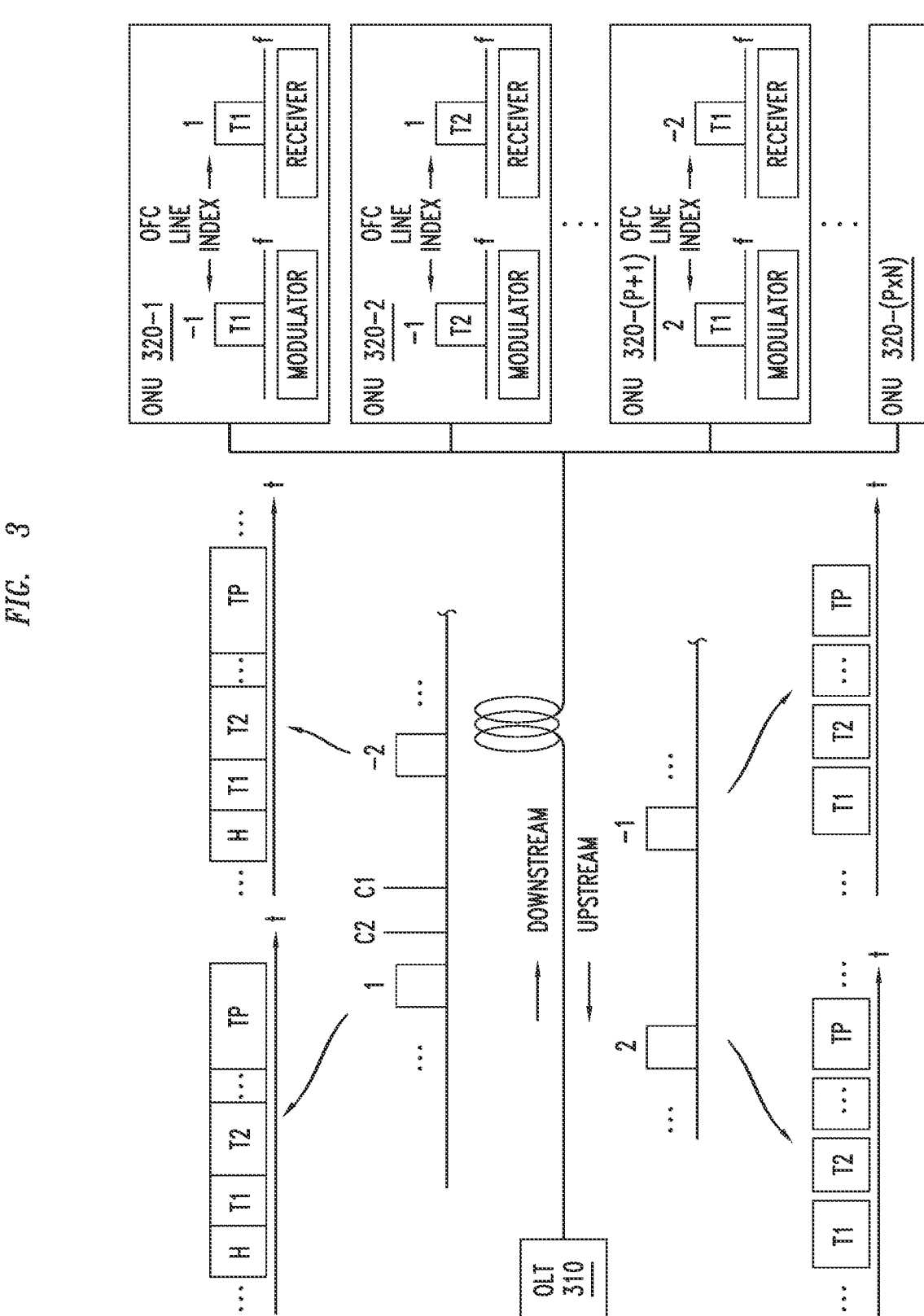
FIG. 3 depicts an example embodiment of a PON configured to support communications between an OLT and a set of ONUs based on OFC locking and use of time division multiplexing (TDM) for downstream communications and time division multiple access (TDMA) for upstream communications.

FIG. 3 depicts an example embodiment of a PON configured to support communications between an OLT and a set of ONUs based on OFC locking and use of time division multiplexing (TDM) for downstream communications and time division multiple access (TDMA) for upstream communications. As illustrated in FIG. 3, the PON 300 includes an OLT 310 and P×N ONUs (illustratively, ONU 320-1 to ONU 320-(P×N)). As illustrated in FIG. 3, P time slots are supported for each optical frequency line of the OFC based on TDM/TDMA. For example, for DS communication from the OLT 310 toward the ONUs 320, the optical frequency line with index "1" is being shared in time using P time slots in order to use that optical frequency line to support DS communications to P different ONUs 320 (illustratively, using optical frequency line "1" in a first timeslot for ONU 320-1, using optical frequency line "1" in a second time slot for ONU 320-2, and so forth, with the optical frequency line "1" now able to support DS communication to up to P ONUs 320 using the P different time slots). For example, for US communication from the ONUs 320 toward the OLT 310, the optical frequency line with index "−1" is being used to support US communications from P different ONUs 320 (illustratively, using optical frequency line "−1" in a first time slot for ONU 320-1, using optical frequency line "−1" in a second time slot for ONU 320-2, and so forth, with the optical frequency line "−1" now able to support US communications for up to P ONUs 320 using the P different time slots). It will be appreciated that the widths of the time slots are not necessarily drawn to scale and may vary across the time slots (e.g., time slots may have the same widths, different widths, or the like, as well as various combinations thereof). Accordingly, rather than supporting only N ONUs as in the PON 100 of FIG. 1, the PON 300 is able to support a total of P×N ONUs (with each pair of the N optical frequency lines of the OFC supporting P ONUs 320 based on time-based sharing of each optical frequency line of the OFC using P time slots). It is noted that, in the more general case, the PON 300 may be configured to support [P1+ P2+ . . . + PN] ONUs, where P1 ONUs can use TDMA on optical frequency line 1, P2 ONUs can use TDMA on optical frequency line 2, and so forth).

Figure 4:
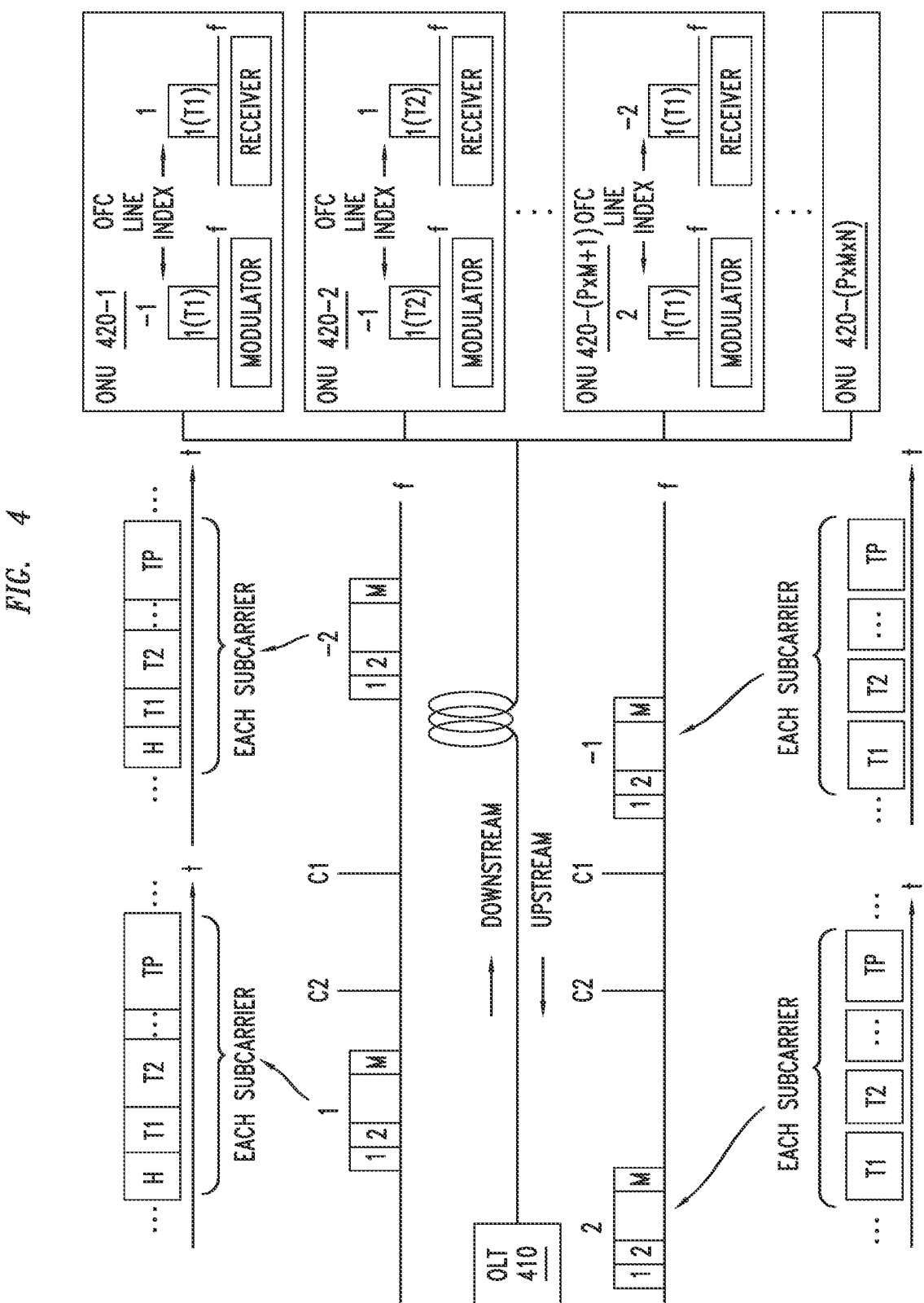
FIG. 4 depicts an example embodiment of a PON configured to support communications between an OLT and a set of ONUs based on OFC locking and use of subcarrier multiplexing in combination with time division multiplexing (TDM) for downstream communications and time division multiple access (TDMA) for upstream communications.

FIG. 4 depicts an example embodiment of a PON configured to support communications between an OLT and a set of ONUs based on OFC locking and use of subcarrier multiplexing in combination with time division multiplexing (TDM) for downstream communications and time division multiple access (TDMA) for upstream communications. As illustrated in FIG. 4, the PON 400 includes an OLT 410 and P×M×N ONUs 420 (illustratively, ONU 420-1 to ONU 420-(P×M×N)). As illustrated in FIG. 4, M subcarriers are supported for each optical frequency line of the OFC based on subcarrier multiplexing and P time slots are supported for each of the M subcarriers based on TDM/TDMA. For example, for DS communication from the OLT 410 toward the ONUs 420, the optical frequency line with index "n" is being used to support DS communications to M×P different ONUs 420 (e.g., with each of the M subcarriers being shared using P time slots such that each group of P ONUs 420 in the set of M×P ONUs 420 supported based on the optical frequency line with index "n" is using a respective one of the M subcarriers and the P ONUs 420 in the group of P ONUs 420 is sharing the respective one of the M subcarriers using P time slots associated with the P ONUs 420, respectively). For example, for US communication from the ONUs 420 toward the OLT 410, the optical frequency line with index "n" is being used to support US communications to M×P different ONUs 420 (e.g., with each of the M subcarriers being shared using P time slots such that each group of P ONUs in the set of M×P ONUs supported based on the optical frequency line with index "n" is using a respective one of the M subcarriers and the P ONUs 420 in the group of P ONUs 420 is sharing the respective one of the M subcarriers using P time slots associated with the P ONUs 420, respectively). It will be appreciated that the widths of the time slots are not necessarily drawn to scale and may vary across the time slots (e.g., time slots may have the same widths, different widths, or the like, as well as various combinations thereof). Accordingly, rather than supporting only N ONUs as in the PON 100 of FIG. 1, only N×M ONUs as in the PON 200 of FIG. 2, or only P×N ONUs as in the PON 300 of FIG. 3, the PON 400 is able to support a total of P×M×N ONUs (with each pair of the N optical frequency lines of the OFC supporting M×P ONUs 420 based on division of each optical frequency line of the OFC into M subcarriers and sharing of each subcarrier using P time slots).

Figure 5:
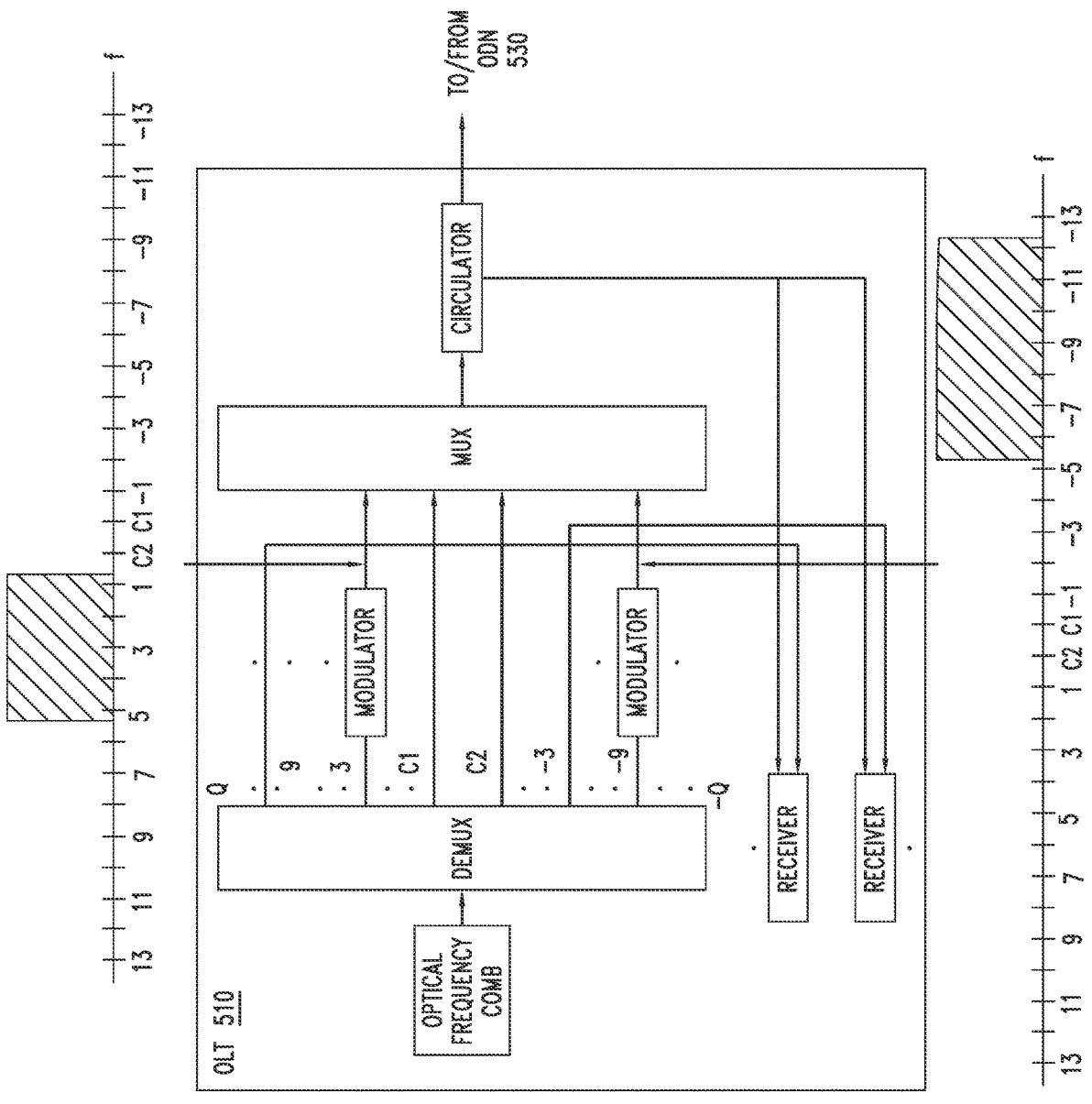
FIG. 5 depicts an example embodiment of a PON configured to support communications between an OLT and a set of ONUs based on OFC locking and use of subcarrier multiplexing where bandwidth for a set of subcarriers is defined across multiple optical frequency lines of the OFC.
Figure 5:
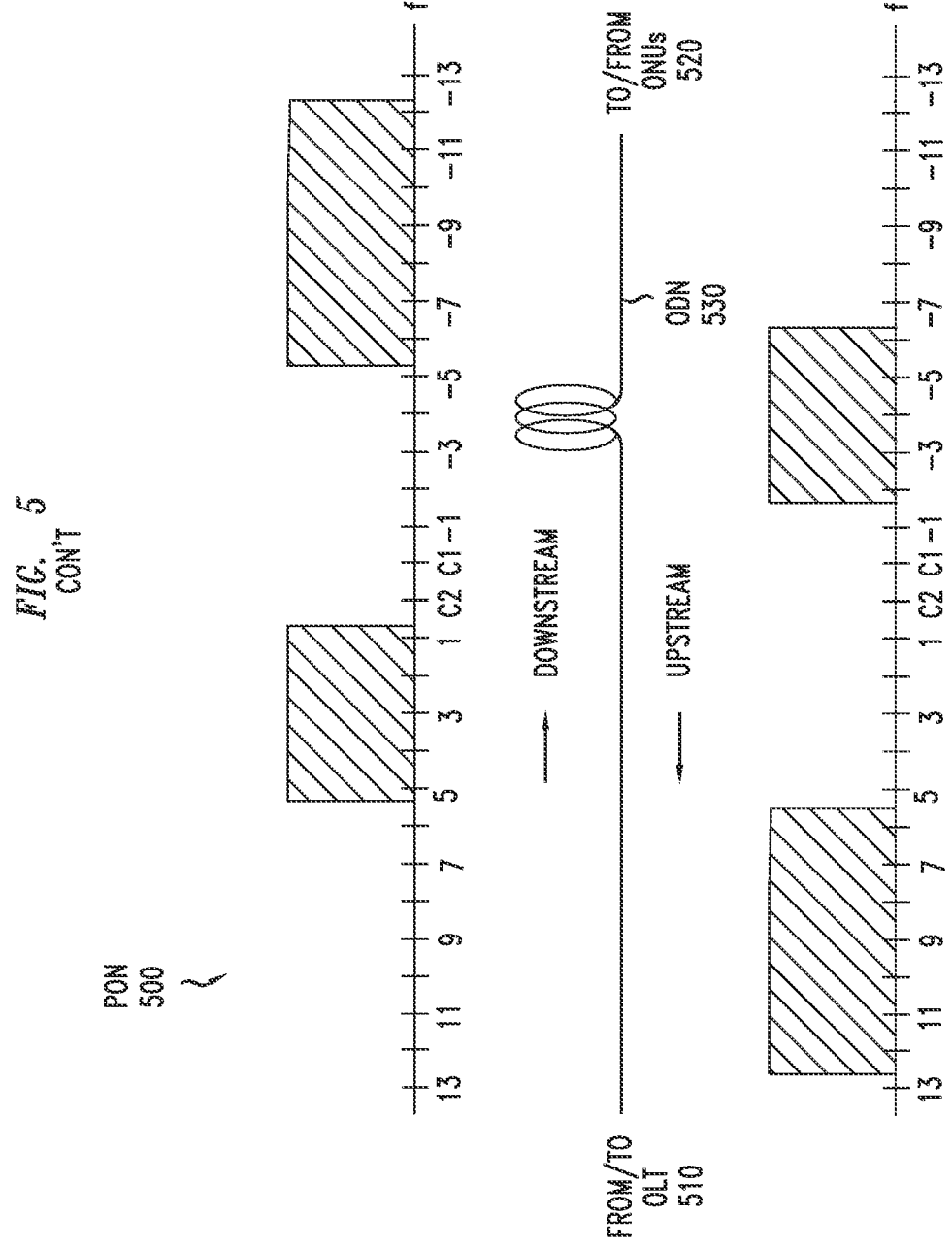
Figure 5:
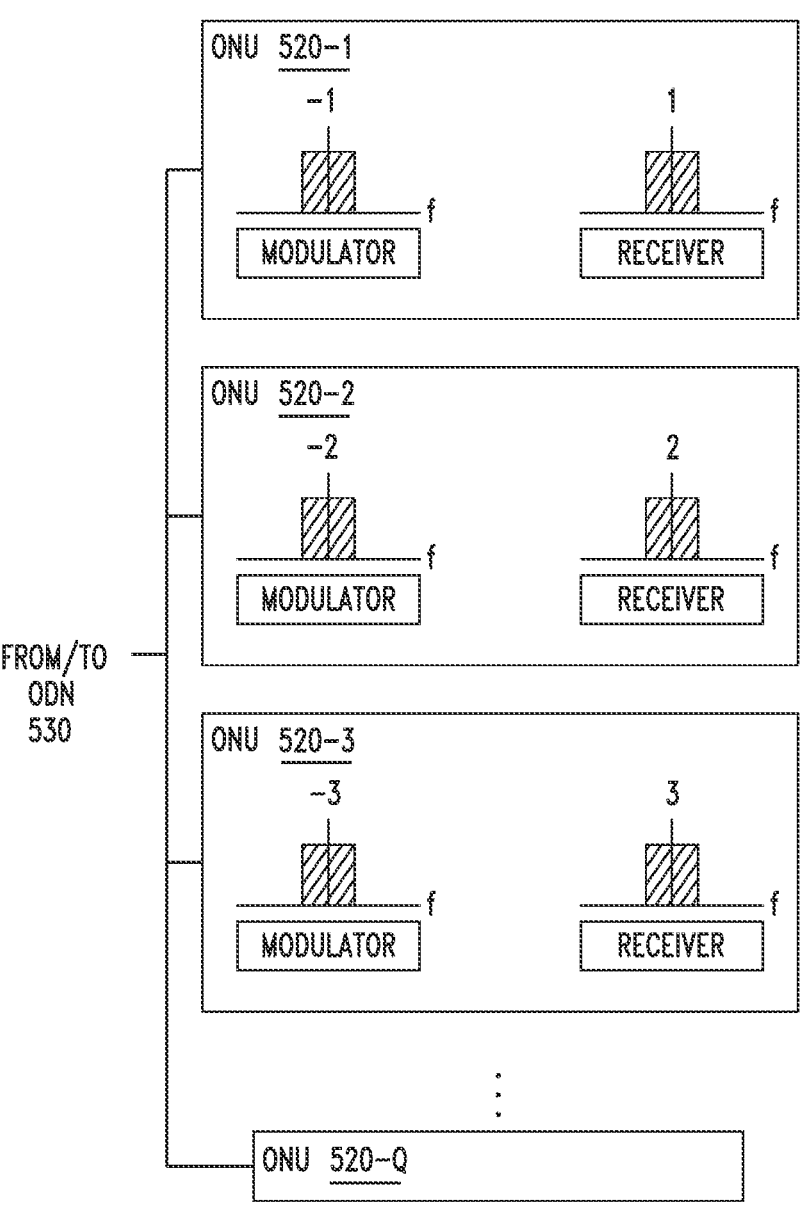

FIG. 5 depicts an example embodiment of a PON configured to support communications between an OLT and a set of ONUs based on OFC locking and use of subcarrier multiplexing where bandwidth for a set of subcarriers is defined across multiple optical frequency lines of the OFC.

As illustrated in FIG. 5, the PON 500 includes an OLT 510 and Q ONUs (illustratively, ONU 520-1 to ONU 520-Q). As illustrated in FIG. 5, rather than defining the bandwidth for a set of subcarriers over a single optical frequency line of an OFC (such that the single optical frequency line of the OFC supports each of the subcarriers), the bandwidth for a set of subcarriers may be defined over a single, center optical frequency line in a set of multiple optical frequency lines (such that only the single, center different optical frequency lines in the set of optical frequency lines needs to be used at the OLT 510, while the optical frequency lines in the set of multiple optical frequency lines may be mapped 1:1 to subcarriers in the set of subcarriers at the ONUs 520, respectively).

In the OLT 510, each modulator generates a set of subcarriers defined across multiple optical frequency lines of the OFC. For example, in FIG. 5, the modulator on OFC line 3 generates five subcarriers spanning across OFC lines 1 to 5, where the subcarrier coinciding with OFC line 1 is received by ONU 520-1, the subcarrier coinciding with OFC line 2 is received by ONU 520-2, the subcarrier coinciding with OFC line 3 is received by ONU 520-3, and so forth). For example, in FIG. 5, the modulator on OFC line −9 generates seven subcarriers spanning across OFC lines −6 to −12, where the subcarriers coinciding with OFC lines within the span of OFC lines may be received by various other ONUs 520 which are not explicitly depicted in FIG. 5).

In the OLT 510, each receiver detects a set of subcarriers in the OLT, each receiver detects a set of subcarriers defined across multiple optical frequency lines of the OFC. For example, in FIG. 5, the receiver with the LO that is OFC line −3 detects five subcarriers spanning across the OFC lines −1 to −5, where the subcarrier coinciding with the OFC line −1 is transmitted by ONU 520-1, the subcarrier coinciding with the OFC line −2 is transmitted by the ONU 520-2, the subcarrier coinciding with the OFC line −3 is transmitted by ONU 520-3, and so forth. For example, in FIG. 5, the receiver with the LO that is the OFC line 9 detects seven subcarriers spanning across the lines 6 to 12, where the subcarriers coinciding with the OFC lines within the span of OFC lines may be transmitted by various other ONUs 520 which are not explicitly depicted in FIG. 5.

It will be appreciated that, although primarily presented with respect to specific examples with respect to the center OFC lines at which the subcarrier sets are defined and the quantity of subcarriers per subcarrier set, the sets of subcarriers may be defined in various other ways (e.g., using other OFC lines as the center OFC line for any set of subcarriers, using fewer or more subcarriers per subcarrier set, or the like, as well as various combinations thereof.

It will be appreciated that, although primarily presented with respect to use of specific types and combinations of statistical multiplexing techniques (e.g., multiplexing of frequency resources using subcarriers and/or multiplexing of time resource using TDM/TDMA), various other types of statistical multiplexing techniques may be used, various other combinations of statistical multiplexing techniques may be used, or the like, as well as various combinations thereof.

FIG. 6 depicts an example embodiment of a method for use by an OLT for supporting communications between the OLT and a set of ONUs based on OFC locking. It will be appreciated that, although primarily presented as being performed serially, at least a portion of the functions of the method 600 may be performed contemporaneously or in a different order than as presented with respect to FIG. 6. At block 601, method 600 begins. At block 610, generate an optical frequency comb including a set of optical frequency lines, wherein the set of optical frequency lines includes a set of seed optical frequency lines and a set of communication optical frequency lines configured to support communications between an optical line terminal (OLT) and a set of optical network units (ONUs). At block 620, transmit the set of seed optical frequency lines downstream from the OLT toward the ONUs. At block 630, transmit downstream data signals from the OLT toward the ONUs based on a first subset of the communication optical frequency lines. At block 640, receive upstream data signals at the OLT from the ONUs based on a second subset of the communication optical frequency lines. At block 699, the method 600 ends. It will be appreciated that various functions presented herein with respect to FIGS. 1-5 may be incorporated within the context of method 600 of FIG. 6.

FIG. 7 depicts an example embodiment of a method for use by an ONU for supporting communications between an OLT and the ONU based on OFC locking. It will be appreciated that, although primarily presented as being performed serially, at least a portion of the functions of the method 700 may be performed contemporaneously or in a different order than as presented with respect to FIG. 7. At block 701, method 700 begins. At block 710, receive a set of seed optical frequency lines of an optical frequency comb. At block 720, regenerate, based on the set of seed optical frequency lines, a regenerated optical frequency comb, wherein the regenerated optical frequency comb includes a set of optical frequency lines, wherein the set of optical frequency lines includes the set of seed optical frequency lines and a set of communication optical frequency lines configured to support communications between an optical network unit (ONU) and an optical line terminal (OLT). At block 730, transmit upstream data signals from the ONU toward the OLT based on a first subset of the communication optical frequency lines. At block 740, receive downstream data signals from the OLT based on a second subset of the communication optical frequency lines. At block 799, the method 700 ends. It will be appreciated that various functions presented herein with respect to FIGS. 1-5 may be incorporated within the context of method 700 of FIG. 7.

Various example embodiments for using a comb-based approach to provide a PON may provide various advantages or potential advantages. For example, various example embodiments for using a comb-based approach to provide a PON may support improved communications in various types of PONs, including direct detection PONs, coherent detection PONs, and so forth. For example, various example embodiments for using a comb-based approach to provide a PON may support transitioning of PON from use of IM-DD to use of coherent technology by solving various problems associated with the adaptation of coherent technology for PON. For example, various example embodiments for using a comb-based approach to provide a PON may provide various advantages, such as supporting relatively easy reconfigurability (e.g., dynamically changing the mapping of optical frequency lines of the OFC to the ONUs for downstream and upstream communications), supporting relatively easy scalability (e.g., increasing the number of optical frequency lines of the OFC to support additional ONUs), supporting dynamically flexible data rates, supporting improved spectral efficiency (e.g., by enabling downstream and upstream bands to be close to each other without the need for guard bands), ensuring less transmission span nonlinearity, enabling use of improved coherent DSP at both the OLT and the ONUs (e.g., locking of the carrier signals and LOs in both directions enables use of low cost, low latency, low complexity, and low power DSP at the receivers as there is no need for frequency offset compensation and there is no, or at least less complex, phase recovery), or the like, as well as various combinations thereof. For example, various example embodiments for using a comb-based approach to provide a PON may overcome various limitations associated with the use of single carrier transceivers at the OLT and the ONUs, such as limited bandwidth between the OLT and the ONUs, limitations in the data rate for ONU and/or the number of ONUs which may be supported by the OLT (even where subcarrier multiplexing and/or locking lasers at the OLT and the ONUs are used), and the need for use of particularly expensive capabilities when certain techniques are applied to try to increase bandwidth (e.g., the need for a fast and dynamic rescaling of the upstream receiver ADCs when TDMA is used for upstream multiplexing). For example, various example embodiments for using a comb-based approach to provide a PON may be used in combination with various multiplexing and/or multiple access techniques (e.g., subcarrier multiplexing, TDM, TDMA, and so forth) to enable a hierarchy of statistical multiplexing at various levels (e.g. optical frequency line, digital subcarrier, TDM/TDMA, and so forth) that may have various benefits such as support for additional ONUs and/or support for flexible data rates. For example, various example embodiments for using a comb-based approach to provide a PON, based on assignment of ONUs to dedicated optical frequency lines of the OFC, may alleviate various physical layer problems (e.g., signals from different ONUs with similar received powers can be grouped together for various purposes, such as for better performance with subcarrier multiplexing, to avoid the need for fast dynamic rescaling of the ADCs for upstream bursts when using TDMA (statistical multiplexing), and so forth). For example, various example embodiments for using a comb-based approach to provide a PON may provide a PON while obviating the need for use of expensive stable lasers at the OLT and the ONUs in order to use TDMA for upstream communications, obviating the need to support rapid rescaling of the range of ADCs to digitize the burst-mode signals in order to use TDMA for upstream communications, obviating the need for use of complex and power-hungry coherent DSP, and so forth. It will be appreciated that various example embodiments for using a comb-based approach to provide a PON may provide various other advantages or potential advantages.

Figure 8:
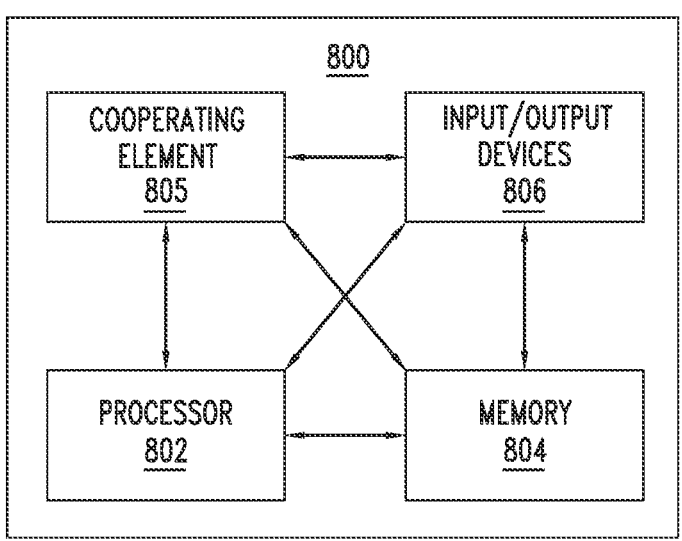
FIG. 8 depicts an example embodiment of a computer suitable for use in performing various functions presented herein.

FIG. 8 depicts an example embodiment of a computer suitable for use in performing various functions presented herein.

The computer 800 includes a processor 802 (e.g., a central processing unit (CPU), a processor, a processor having a set of processor cores, a processor core of a processor, or the like) and a memory 804 (e.g., a random access memory (RAM), a read-only memory (ROM), or the like). In at least some example embodiments, the computer 800 may include at least one processor and at least one memory storing instructions that, when executed by the at least one processor, cause the computer to perform various functions presented herein.

The computer 800 also may include a cooperating element 805. The cooperating element 805 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer readable medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, the computer 800 may provide a general architecture and functionality that is suitable for implementing one or more elements presented herein. For example, the computer 800 may provide a general architecture and functionality that is suitable for implementing at least one of an OLT or a portion thereof, an ONU or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
an optical frequency comb generator configured to generate an optical frequency comb for an optical line terminal (OLT) supporting a set of N optical network units (ONUs), wherein the optical frequency comb includes a set of optical frequency lines, wherein the set of optical frequency lines includes a set of seed optical frequency lines and a set of 2N communication optical frequency lines configured to support communications between the OLT and the ONUs, wherein the set of seed optical frequency lines and the set of 2N communication optical frequency lines are mutually exclusive;
wherein the apparatus is configured to transmit the set of seed optical frequency lines downstream from the OLT toward the ONUs;
wherein the apparatus is configured to transmit downstream data signals from the OLT toward the ONUs based on a first subset of the communication optical frequency lines including N of the communication optical frequency lines;

wherein the apparatus is configured to receive upstream data signals at the OLT from the ONUs based on a second subset of the communication optical frequency lines including N of the communication optical frequency lines, wherein the first and second subsets of communication optical frequency lines are mutually exclusive.

2. The apparatus of claim 1, wherein the set of seed optical frequency lines includes at least two optical frequency lines of the optical frequency comb.

3. The apparatus of claim 1, wherein the apparatus is configured to provide the first subset of the communication optical frequency lines to a set of modulators as carrier signals for generation of the downstream data signals based on modulation of the first subset of the communication optical frequency lines with downstream data.

4. The apparatus of claim 1, wherein the apparatus is configured to multiplex the seed optical frequency lines and the downstream data signals to form a multiplexed downstream signal for transmission from the OLT toward the ONUs.

5. The apparatus of claim 1, wherein the apparatus is configured to provide the upstream data signals to a set of direct detection receivers for detection of the set of upstream data signals to recover upstream data.

6. The apparatus of claim 1, wherein the apparatus is configured to provide the second subset of the communication optical frequency lines to a set of coherent receivers for detection of the upstream data signals based on application of the second subset of the communication optical frequency lines as local oscillators to recover upstream data.

7. The apparatus of claim 1, wherein the set of seed optical frequency lines, the downstream data signals, and the upstream data signals are carried over an optical fiber.

8. A method, comprising:
generating an optical frequency comb for an optical line terminal (OLT) supporting a set of N optical network units (ONUs), wherein the optical frequency comb includes a set of optical frequency lines, wherein the set of optical frequency lines includes a set of seed optical frequency lines and a set of 2N communication optical frequency lines configured to support communications between the OLT and the ONUs, wherein the set of seed optical frequency lines and the set of 2N communication optical frequency lines are mutually exclusive;
transmitting the set of seed optical frequency lines downstream from the OLT toward the ONUs;
transmitting downstream data signals from the OLT toward the ONUs based on a first subset of the communication optical frequency lines including N of the communication optical frequency lines; and
receiving upstream data signals at the OLT from the ONUs based on a second subset of the communication optical frequency lines including N of the communication optical frequency lines, wherein the first and second subsets of communication optical frequency lines are mutually exclusive.

9. An apparatus, comprising:
an optical frequency comb regenerator configured to receive a set of seed optical frequency lines of an optical frequency comb and regenerate, based on the set of seed optical frequency lines, a regenerated optical frequency comb, wherein the regenerated optical frequency comb includes a set of optical frequency lines, wherein the set of optical frequency lines includes the set of seed optical frequency lines and a set of communication optical frequency lines configured to support communications between an optical network unit (ONU) and an optical line terminal (OLT);

wherein the apparatus is configured to transmit upstream data signals from the ONU toward the OLT based on a first subset of the communication optical frequency lines; and wherein the apparatus is configured to receive downstream data signals from the OLT based on a second subset of the communication optical frequency lines.

10. The apparatus of claim 9, wherein the regenerated optical frequency comb includes a subset of the optical frequency comb, wherein the optical frequency comb is generated at a transmitter.

11. The apparatus of claim 9, wherein the first subset of the communication optical frequency lines includes one or more optical frequency lines of the regenerated optical frequency comb.

12. The apparatus of claim 9, wherein the second subset of the communication optical frequency lines includes one or more optical frequency lines of the regenerated optical frequency comb.

13. The apparatus of claim 9, wherein the apparatus is configured to provide the first subset of the communication optical frequency lines to a set of modulators as carrier signals for generation of the upstream data signals based on modulation of the first subset of the communication optical frequency lines with upstream data.

14. The apparatus of claim 9, wherein the apparatus is configured to provide the downstream data signals to a set of direct detection receivers for detection of the set of downstream data signals to recover downstream data.

15. The apparatus of claim 9, wherein the apparatus is configured to provide the second subset of the communication optical frequency lines to a set of coherent receivers for detection of the downstream data signals based on application of the second subset of the communication optical frequency lines as local oscillators to recover downstream data.

16. The apparatus of claim 9, wherein the set of seed optical frequency lines, the upstream data signals, and the downstream data signals are carried over an optical fiber.

17. A method, comprising:

receiving a set of seed optical frequency lines of an optical frequency comb;

regenerating, based on the set of seed optical frequency lines, a regenerated optical frequency comb, wherein the regenerated optical frequency comb includes a set of optical frequency lines, wherein the set of optical frequency lines includes the set of seed optical frequency lines and a set of communication optical frequency lines configured to support communications between an optical network unit (ONU) and an optical line terminal (OLT);

transmitting upstream data signals from the ONU toward the OLT based on a first subset of the communication optical frequency lines; and receiving downstream data signals from the OLT based on a second subset of the communication optical frequency lines.

* * * * *